(12) United States Patent
Kai

(10) Patent No.: US 7,433,601 B2
(45) Date of Patent: Oct. 7, 2008

(54) OPTICAL NETWORK AND OPTICAL ADD/DROP APPARATUS

(75) Inventor: Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 11/038,515

(22) Filed: Jan. 21, 2005

(65) Prior Publication Data

US 2006/0067696 A1    Mar. 30, 2006

(30) Foreign Application Priority Data

Sep. 30, 2004  (JP)  ............................. 2004-287680

(51) Int. Cl.
*H04J 14/02* (2006.01)
*H04J 14/00* (2006.01)

(52) U.S. Cl. .............................. 398/85; 398/69; 398/73

(58) Field of Classification Search .................. 398/68, 398/69, 73, 83–85
See application file for complete search history.

(56) References Cited

U.S. PATENT DOCUMENTS

| 6,323,975 | B1 * | 11/2001 | Kurki ............................. 398/9 |
| 6,333,798 | B1 | 12/2001 | Allan et al. |
| 6,611,638 | B2 | 8/2003 | Sakano |
| 2002/0039213 | A1 | 4/2002 | Duerksen |
| 2002/0126291 | A1 * | 9/2002 | Qian et al. .................. 356/450 |
| 2003/0128984 | A1 | 7/2003 | Oberg et al. |
| 2004/0141746 | A1 | 7/2004 | Oberg |
| 2004/0175180 | A1 * | 9/2004 | Sugaya ........................ 398/85 |

FOREIGN PATENT DOCUMENTS

| EP | 0977394 | 2/2000 |
| JP | 11-218790 | 10/1999 |
| WO | 00/76105 | 12/2000 |

OTHER PUBLICATIONS

Nakagawa et al., "Photonic Gateway for Metro Network using Acousto-Optic Tunable Filter," "Shingaku Gihou," vol. 103, No. 68, p. 13-17, (May 23, 2003).
Partial European Search Report dated May 29, 2006.
European Search Report dated Aug. 18, 2006.

* cited by examiner

*Primary Examiner*—Jason Chan
*Assistant Examiner*—Nathan M Curs
(74) *Attorney, Agent, or Firm*—Staas & Halsey LLP

(57) ABSTRACT

Provided are a plurality of fixed wavelength drop filters 35 demultiplexing optical signals having a plurality of different fixed wavelengths, a plurality of fixed wavelength add filters 36 provided corresponding respectively to the fixed wavelength drop filters 35 and adding the optical signals having the fixed wavelengths wavelength division multiplexed light flowing along a transmission path 1, a first optical branching unit 31 branching part of the wavelength division multiplexed light flowing along the transmission path 1, and a variable wavelength drop filter 32 demultiplexing the optical signal having the wavelength corresponding to a specified value from the wavelength division multiplexed light branched by the first optical branching unit 31.

16 Claims, 18 Drawing Sheets

FIG.8

| NODE | #1 RECEIVING NODE | #2 RECEIVING NODE | #3 RECEIVING NODE | #4 RECEIVING NODE | #5 RECEIVING NODE |
|---|---|---|---|---|---|
| #1 TRANSMITTING NODE | — | 1 | 2 | 3 | 4 |
| #2 TRANSMITTING NODE | 1 | — | 5 | 6 | 7 |
| #3 TRANSMITTING NODE | 2 | 5 | — | 8 | 9 |
| #4 TRANSMITTING NODE | 3 | 6 | 8 | — | 10 |
| #5 TRANSMITTING NODE | 4 | 7 | 9 | 10 | — |

FIG.9

| NUMBER OF NODES | NON-REUSE CASE OF WAVELENGTH | PRESENT EXAMPLE |
|---|---|---|
| 3 | 6 | 3 |
| 4 | 12 | 6 |
| 5 | 20 | 10 |
| 6 | 30 | 15 |
| 7 | 42 | 21 |
| 8 | 56 | 28 |
| 9 | 72 | 36 |
| 10 | 90 | 45 |

FIG.10

| NUMBER OF NODES | PRIOR ART | PRESENT CASE |
|---|---|---|
| 3 | 100% | 33% (1/3) |
| 4 | 100% | 25% (1/4) |
| 5 | 100% | 20% (1/5) |
| 6 | 100% | 17% (1/6) |
| 7 | 100% | 14% (1/7) |
| 8 | 100% | 12.5% (1/8) |
| 9 | 100% | 11% (1/9) |
| 10 | 100% | 10% (1/10) |

FIG.14

| NODE | #1 RECEIVING NODE | #2 RECEIVING NODE | #3 RECEIVING NODE | #4 RECEIVING NODE | #5 RECEIVING NODE |
|---|---|---|---|---|---|
| #1 TRANSMITTING NODE | — | 4 | 3 | 2 | 1 |
| #2 TRANSMITTING NODE | 5 | — | 7 | 6 | 4 |
| #3 TRANSMITTING NODE | 8 | 9 | — | 7 | 3 |
| #4 TRANSMITTING NODE | 11 | 10 | 9 | — | 2 |
| #5 TRANSMITTING NODE | 12 | 5 | 8 | 9 | — |

OPTICAL NETWORK AND OPTICAL ADD/DROP APPARATUS

BACKGROUND OF THE INVENTION

The invention relates to an optical network and an optical add/drop apparatus used in the optical network.

At the present, in an optical network (which is also called a photonic network), there increases importance of a function "optical add/drop (OADM: Optical Add/Drop Multiplexer)" of dropping and adding a flux of signal light having a specified wavelength from signal light subjected to wavelength division multiplexing (WDM) in an optical node (refer to, e.g., Patent documents 1 and 2).

A conventional typical network is configured by a high-speed backbone network and lower-speed sub-networks connected to the backbone network. In this type of network architecture, respective nodes connected directly to the backbone network and the individual nodes connected to the sub-networks were incapable of performing communications without any restrictions. For example, each node connected directly to the backbone network is at first required to be connected to the sub-network via a relay device located at a terminal station on the backbone network.

With advancement of the optical network, however, there arises a demand for connecting a multiplicity of nodes on the network logically almost at the same time. For example, in a communication system for connecting comparatively proximal nodes between metropolises as called a metropolitan area access network, there is a demand for enabling the communications to be performed without any restrictions by linking the respective nodes on the network logically in a mesh-like configuration. This type of network enabling the nodes to communicate with each other substantially simultaneously is termed a full-mesh network. A low-cost and small-scale full-mesh optical network capable of communicating between the nodes without the restrictions has hitherto been demanded in an office-to-office network, grid computing and so on.

Each of the nodes on the this type of optical network was, however, required to be made capable of transmitting and receiving fluxes of light having different wavelengths corresponding to other respective nodes in order to freely communicate with other nodes on the optical network. Therefore, a node architecture became complicated, and devices that structure the nodes came to a large scale and were expensive.

FIG. 1 shows an example of a network physically taking a so-called full-mesh topology enabling the plurality of nodes to be connected simultaneously. As illustrated in FIG. 1, when configuring the full-mesh optical network, a multiplicity of optical fibers was physically needed. Hence, this network was hard to be built up in the metropolitan area having a small amount of allowable space.

FIG. 2 shows an example of the full-mesh network, which, though physically as a ring network, enables the plurality of nodes to be logically connected simultaneously. In this case, it is required that each node be capable of transmitting and receiving the multiplicity of wavelengths corresponding to the number of nodes on the network. Therefore, each node needs a multiplicity of optical function components such as array waveguide type diffraction grating, a 2×2 optical switch, an optical filter, an optical amplifier and so forth. In this case, each node has a necessity of setting the respective optical function components in linkage, which involves complicated control. Accordingly, there is a case where each node might be upsized as large as a device in a backbone system. The full-mesh network was therefore difficult to be actualized at a low cost. Further, it was also difficult to introduce this network into the metropolitan area having the small amount of allowable space. Moreover, it was also considered that there was no necessity of taking the trouble to introduce the large-scale and high-cost full-mesh network.

Further, in the communications of nowadays, one-to-many communications, which are so-called multicast communications, are requested in addition to one-to-one communications between the respective nodes. Given in the optical networks in FIGS. 3 and 4 are examples of multicasting in which one single node transmits the same information to other plural nodes. In the example in FIG. 3, the respective nodes are allocated with receipt wavelengths and transmission wavelengths corresponding to other transmission partner nodes.

For instance, a node #1 is allocated with transmission wavelengths $\lambda 1$, $\lambda 2$ and $\lambda 3$ to nodes #2, #3 and #4. Further, the node #1 is allocated with receipt wavelengths $\lambda 4$, $\lambda 7$ and $\lambda 10$ from the nodes #2, #3 and #4.

In this type of network architecture, when the node #1 tries to distribute, e.g., the same video information to the nodes #2, #3 and #4 by multicasting, it follows that input ports of the respective nodes corresponding to $\lambda 1$, $\lambda 2$ and $\lambda 3$ defined as optical signals transmitted from the node #1 are occupied. Accordingly, in this case, output ports of the node #1 are all occupied by the multicasting, and it is impossible to perform one-to-one transmission, which is so-called unicast, from the node #1 to other node.

Moreover, the node in the conventional optical network involves using a fixed wavelength drop filter for selecting (which may also be called demultiplexing or dropping) the light having a specified wavelength from wavelength division multiplexed light, and a fixed wavelength add filter for adding (which may also be called inserting or adding) the light having the specified wavelength to the wavelength division multiplexed light. The conventional drop filter had, however, a case of being unable to completely removing the light having a drop target wavelength from the wavelength division multiplexed light. Accordingly, as in the network shown in FIG. 4, there was a case in which it is impossible to use, so to speak, reuse the same wavelength as the received wavelength by way of a wavelength for transmission.

In the example in FIG. 4, the light having the wavelength $\lambda 1$ is used for the transmission to the node #2 from the node #1, and the wavelength $\lambda 4$ is employed for the transmission to the node #1 from the node #2. In this type of system, the two wavelengths are required between the two nodes, and there were needed the different wavelengths of which the number is twice the number of combinations of the nodes performing the communications across the network. Hence, this system required extremely a high-band WDM amplifier for amplifying the wavelength division multiplexed light traveling across the optical network, resulting in a high cost for building up the network.

[Patent document 1] Japanese Patent Application Laid-Open Publication No. 11-218790

[Patent document 2] Japanese Patent Application Laid-Open Publication No. 2002-214473

SUMMARY OF THE INVENTION

It is an object of the invention is to provide a technology capable of connecting a plurality of nodes on an optical network with a simple and compact configuration.

The invention adopts the following means for solving the problems. Namely, the invention is an optical add drop apparatus comprising a plurality of fixed wavelength drop filters connected in series to a transmission path and each demultiplexing an optical signal having a fixed wavelength from wavelength division multiplexed light flowing along the transmission path, a plurality of fixed wavelength add filters connected in series to the transmission path and to the fixed wavelength drop filters, and each adding the optical signal having the fixed wavelength to be transmitted to a transmission source of each of the demultiplexed optical signals to the wavelength division multiplexed light flowing along the transmission path, a first optical branching unit connected in series to the transmission path and to the fixed wavelength drop filter and the fixed wavelength add filter, and branching part of the wavelength division multiplexed light flowing along the transmission path, and a variable wavelength drop filter demultiplexing the optical signal having the wavelength corresponding to a specified value from the wavelength division multiplexed light branched by the first optical branching unit.

The optical add drop apparatus is capable of communicating with the plurality of specified communication partner nodes through the plurality of fixed wavelength drop filters and the plurality of fixed wavelength add filters, and is capable of receiving the optical signals having the wavelengths that are not employed for the communications with the specified communication partner nodes through the variable wavelength drop filter.

Further, the optical add drop apparatus may further comprise a second optical branching unit connected in series to the transmission path, the fixed wavelength drop filter, the fixed wavelength add filter and the first optical branching unit, and branching part of the wavelength division multiplexed light flowing along the transmission path in a direction different from the wavelength division multiplexed light branched by the first branching unit, and an optical multiplexing unit multiplexing the wavelength division multiplexed light branched by the first optical branching unit and by the second optical branching unit, wherein the variable wavelength drop filter may demultiplex the optical signal having the wavelength corresponding to a specified value from the wavelength division multiplexed light multiplexed by the optical multiplexing unit.

The wavelength division multiplexed light branched by the first optical branching unit and by the second optical branching unit is multiplexed, wherein the first optical branching unit branches the optical signals coming from a first direction of the transmission path, while the second optical branching unit branches the optical signals coming from a second direction of the transmission path, with the result that the variable wavelength drop filter can select and receive the specified wavelength contained in the optical signals coming from the two directions that connect to the optical add drop apparatus.

Moreover, a fixed wavelength add drop module may be formed by pairing the fixed wavelength drop filter and the fixed wavelength add filter adding the optical signal to be transmitted to the transmission source of the optical signal to be demultiplexed by the fixed wavelength drop filter. This module construction facilitates adding and removing the fixed wavelength drop filter and the fixed wavelength add filter to and from the optical add drop apparatus.

Further, a drop filter string may be formed by connecting the plurality of fixed wavelength drop filters in series, and an add filter string may be formed by connecting the plurality of fixed wavelength add filters in series. In the case of connecting the optical add drop apparatus to an optical ring network in which the optical signals are traveled in a single direction, the drop filter string may be disposed on the side close to the light receiving end through which the optical signals are inputted to the optical add drop apparatus, and the add filter string may be disposed on the side close to the light transmitting end through which the optical signals are outputted from the optical add drop apparatus.

This configuration being taken, the drop filter string for receiving the optical signals can immediately receive the optical signals, and it is possible to reduce attenuation of the optical signals that is caused by influence of the add filter string portion within the optical add drop apparatus. Moreover, the drop filter string for transmitting the optical signals can immediately transmit the optical signals, and it is feasible to reduce the attenuation of the optical signals that is caused by influence of the drop filter string portion within the optical add drop apparatus.

Furthermore, the variable wavelength drop filter may include an optical amplifier amplifying the wavelength division multiplexed light, a third optical branching unit branching the wavelength division multiplexed light amplified by the optical amplifier into plural fluxes of multiplexed light, and a plurality of variable wavelength drop filter units demultiplexing the optical signals having the wavelengths each corresponding to a specified value from the respective fluxes of wavelength division multiplexed light branched by the third optical branching unit. With this configuration, the optical add drop apparatus can communicate with the plurality of predetermined communication partner nodes through the plurality of fixed wavelength drop filters and the plurality of fixed wavelength add filters, and it is possible to receive through the plurality of variable wavelength drop filter units the optical signals having the plurality of wavelengths that are not employed for the communications with the predetermined communication partner nodes.

Still further, the fixed wavelength drop filter and the fixed wavelength add filter may have 3-port configured filters that use dielectric multi-layered films.

The invention may also be an optical network comprising a plurality of optical add drop apparatuses connected to a transmission path, the optical add drop apparatus comprising a plurality of fixed wavelength drop filters connected in series to a transmission path and each demultiplexing an optical signal having a fixed wavelength from wavelength division multiplexed light flowing along the transmission path, a plurality of fixed wavelength add filters connected in series to the transmission path and to the fixed wavelength drop filters, and each adding a optical signal having a fixed wavelength to be transmitted to a transmission source of each of the demultiplexed optical signals to the wavelength division multiplexed light flowing along the transmission path;

a first optical branching unit connected in series to the transmission path and to the fixed wavelength drop filter and the fixed wavelength add filter, and branching part of the wavelength division multiplexed light flowing along the transmission path, and a variable wavelength drop filter demultiplexing the optical signal having the wavelength corresponding to a specified value from the wavelength division multiplexed light branched by the first optical branching unit.

The optical add drop apparatus constituting each of the nodes on the optical network can communicate with the plurality of predetermined communication partner nodes through the plurality of fixed wavelength drop filters and the plurality of fixed wavelength add filters, and it is possible to receive through the variable wavelength drop filter the optical signals having the plurality of wavelengths that are not employed for the communications with the predetermined communication partner nodes.

Yet further, the optical network may also be a ring network in which an optical signal is transmitted in one direction, and each of the optical add drop apparatuses is connected to the transmission path of which one end serves as a light receiving end and the other end serves as a light transmitting end, the fixed wavelength drop filters of the optical add drop apparatus may be provided corresponding to the number of communication partner optical add drop apparatuses from which the optical add drop apparatus receives the optical signals, and may receive the optical signals respectively from the communication partner optical add drop apparatuses by demultiplexing the optical signals respectively having different wavelengths from the transmission path, the fixed wavelength add filters of the optical add drop apparatus may be provided corresponding to the number of communication partner optical add drop apparatuses to which the optical add drop apparatus transmits the optical signals, and may transmit the optical signals respectively to the communication partner optical add drop apparatuses by adding to the transmission path the optical signals corresponding to the wavelengths of the optical signals that are demultiplexed by the respective fixed wavelength drop filters, and the variable wavelength drop filter of the optical add drop apparatus may demultiplex the optical signals having the wavelengths in the process of being transmitted and received by the fixed wavelength add filters and the fixed wavelength drop filters of any two other optical add drop apparatuses between these two other optical add drop apparatuses, which wavelengths are different from the wavelengths of the optical signals in the process of being received by the fixed wavelength drop filters of the optical add drop apparatus.

With this configuration, each node on the ring-configured (ring topology) optical network can simultaneously communicate through on the optical signals having the different wavelengths with the plurality of communication partner optical add drop apparatuses, and can receive the optical signal in the process of being transmitted and received between two other optical add drop apparatuses.

Moreover, in the optical signals added from the fixed wavelength add filters of a first optical add drop apparatus on the optical network, the optical signal having the wavelength that is demultiplexed by the fixed wavelength drop filter of a second optical add drop apparatus connected in a remotest position from the first optical add drop apparatus on a topology of the optical network, may be added as a transmission signal to other plural optical add drop apparatuses different from the second optical add drop apparatus together to the second optical add drop apparatus on the optical network from the first optical add drop apparatus, and the other plural optical add drop apparatuses may select the transmission signal through their variable wavelength drop filters.

Owing to this configuration, in the optical signals added from the fixed wavelength add filters of the first optical add drop apparatus, the optical signal having the wavelength that is demultiplexed by the fixed wavelength drop filter of the second optical add drop apparatus connected in the remotest position from the first optical add drop apparatus on the topology of the optical network, can be used as the transmission signal to other plural optical add drop apparatuses.

Moreover, in the plurality of fixed wavelength drop filters of the optical add drop apparatus, the fixed wavelength drop filter demultiplexing the optical signal having the wavelength from a remote communication partner optical add drop apparatus in an arrangement sequence from the optical add drop apparatus in the topology of the optical network, may be disposed in a position closer to the light receiving end than the fixed wavelength drop filter demultiplexing the optical signal having the wavelength from a close communication partner optical add drop apparatus in the arrangement sequence, and the fixed wavelength drop filter demultiplexing the optical signal having the wavelength from a close communication partner optical add drop apparatus in the arrangement sequence, is disposed in a position remoter from the light receiving end than the fixed wavelength drop filter demultiplexing the optical signal having the wavelength from a remote communication partner optical add drop apparatus in the arrangement sequence, and in the plurality of fixed wavelength add filters of the optical add drop apparatus, the fixed wavelength add filter adding the optical signal having the wavelength to a remote communication partner optical add drop apparatus in an arrangement sequence from the optical add drop apparatus in the topology of the optical network, may be disposed in a position closer to the light transmitting end than the fixed wavelength add filter adding the optical signal having the wavelength to a close communication partner optical add drop apparatus in the arrangement sequence, and the fixed wavelength add filter adding the optical signal having the wavelength to a close communication partner optical add drop apparatus in the arrangement sequence, may be disposed in a position remoter from the light transmitting end than the fixed wavelength add filter adding the optical signal having the wavelength to a remote communication partner optical add drop apparatus in the arrangement sequence.

With this configuration, the fixed wavelength drop filter demultiplexing the optical signal having the wavelength from the topologically remote communication partner optical add drop apparatus in the arrangement sequence from the optical add drop apparatus concerned, can immediately receive the optical signal, and is not affected by the attenuation of the optical signal that is caused by influence of other fixed wavelength drop filters. Further, the fixed wavelength add filter adding the optical signal having the wavelength to the topologically remote communication partner optical add drop apparatus in the arrangement sequence from the optical add drop apparatus concerned, can immediately transmit the optical signal, whereby the attenuation of the optical signal that is caused by influence of other fixed wavelength add filters, can be reduced.

The fixed wavelength drop filter may be disposed in a position closer to the receiving end than the fixed wavelength add filter, and the fixed wavelength add filter may be disposed in a position closer to the transmitting end than the fixed wavelength drop filter.

This arrangement being taken, the fixed wavelength drop filter receiving the optical signal can immediately receive the optical signal and is not affected by the attenuation of the optical signal that is caused by the influence of the fixed wavelength add filters within the optical add drop apparatus. Further, the fixed wavelength add filter transmitting the optical signal can immediately transmit the optical signal and is not affected by the attenuation of the optical signal that is caused by the influence of the fixed wavelength drop filters within the optical add drop apparatus.

Moreover, the optical network may also be a bus type network in which an optical signal is transmitted bidirectionally, and one end of a transmission path in a first direction of each optical add drop apparatus and the other end of the transmission path in a second direction opposite to the first direction, are connected, respectively serving as connection ends, to each optical add drop apparatus, the fixed wavelength drop filters of the optical add drop apparatus may be provided corresponding to the number of communication partner optical add drop apparatuses from which the optical add drop apparatus receives the optical signals, and, respectively in the first direction and in the second direction, may receive the optical signals from the communication partner optical add drop apparatuses by demultiplexing the optical signals having wavelengths each different for each of the communication partner optical add drop apparatuses from the transmission path, the fixed wavelength add filters of the optical add drop apparatus may be provided corresponding to the number of communication partner optical add drop apparatuses to which the optical add drop apparatus transmits the optical signals, and, respectively in the first direction and in the second direction, may transmit the optical signals to the communication partner optical add drop apparatuses by adding, to the transmission path, the optical signals having wavelengths each different for each of the communication partner optical add drop apparatuses, and the variable wavelength drop filter of the optical add drop apparatus may demultiplex the optical signals having the wavelengths in the process of being transmitted and received by the fixed wavelength add filters and the fixed wavelength drop filters of any two other optical add drop apparatuses between these two other optical add drop apparatuses, which wavelengths are different from the wavelengths of the optical signals in the process of being received by the fixed wavelength drop filters of the optical add drop apparatus.

Owing to this configuration, each node on the bus type optical network can perform the simultaneous communications through on the optical signals having different wavelengths with the plurality of communication partner optical/add apparatuses, and also can receive the optical signals in the process of being transmitted and received between two other optical add drop apparatuses.

Further, in the transmission path respectively in the first direction and in the second direction of the first optical add drop apparatus on the optical network, in the optical signals added from the fixed wavelength add filters of the first optical add drop apparatus, the optical signal having the wavelength dropped by the fixed wavelength drop filter of a second optical add drop apparatus connected in the remotest position from the first optical add drop apparatus in a topology of the optical network, may be added as a transmission signal to other plural optical add drop apparatuses different from the second optical add drop apparatus on the optical network from the first optical add drop apparatus, and the other plural optical add drop apparatuses may select the transmission signal through their variable wavelength drop filters.

Owing to this configuration, in the transmission path respectively in the first direction and in the second direction on the bus type network, in the optical signals added from the fixed wavelength add filters of the first optical add drop apparatus, the optical signal having the wavelength dropped by the fixed wavelength drop filter of the second optical add drop apparatus connected in the remotest position from the first optical add drop apparatus in the topology of the optical network, can be used as the transmission signal to other plural optical add drop apparatuses.

In the plurality of fixed wavelength drop filters of the optical add drop apparatus, respectively in the first direction and in the second direction, the fixed wavelength drop filter demultiplexing the optical signal having the wavelength from a remote communication partner optical add drop apparatus in an arrangement sequence from the optical add drop apparatus in the topology of the network, may be disposed in a position closer to the connection end than the fixed wavelength drop filter demultiplexing the optical signal having the wavelength from a close communication partner optical add drop apparatus in the arrangement sequence, and the fixed wavelength drop filter demultiplexing the optical signal having the wavelength from a close communication partner optical add drop apparatus in the arrangement sequence, may be disposed in a position remoter from the connection end than the fixed wavelength drop filter demultiplexing the optical signal having the wavelength from a remote communication partner optical add drop apparatus in the arrangement sequence, and in the plurality of fixed wavelength add filters of the optical add drop apparatus, respectively in the first direction and in the second direction, the fixed wavelength add filter adding the optical signal having the wavelength to a remote communication partner optical add drop apparatus in an arrangement sequence from the optical add drop apparatus in the topology of the network, may be disposed in a position closer to the connection end than the fixed wavelength add filter adding the optical signal having the wavelength to a close communication partner optical add drop apparatus in the arrangement sequence, and the fixed wavelength add filter adding the optical signal having the wavelength to a close communication partner optical add drop apparatus in the arrangement sequence, may be disposed in a position remoter from the connecting end than the fixed wavelength add filter adding the optical signal having the wavelength to a remote communication partner optical add drop apparatus in the arrangement sequence.

With this configuration, the fixed wavelength drop filter demultiplexing the optical signal having the wavelength from the topologically remote communication partner optical add drop apparatus in the arrangement sequence from the optical add drop apparatus concerned, can immediately receive the optical signal, and it is possible to reduce the attenuation of the optical signal that is caused by the influence of other fixed wavelength drop filters. Moreover, the fixed wavelength add filter adding the optical signal having the wavelength to the topologically remote communication partner optical add drop apparatus in the arrangement sequence from the optical add drop apparatus concerned, can immediately transmit the optical signal, and it is feasible to reduce the attenuation of the optical signal that is caused by the influence of other fixed wavelength add filters.

EFFECTS OF THE INVENTION

According to the invention, it is possible to connect the plurality of nodes on the optical network at a low cost with a simple and compact configuration.

DESCRIPTION OF THE DRAWINGS

FIG. 8 is a diagram showing an associated relation between the nodes on the optical network in FIG. 7 and the wavelengths, FIG. 9 is a diagram showing the number of nodes configuring the network and the number of wavelengths for the respective nodes to actualize communications in the full-mesh configuration (topology).

FIG. 10 is a diagram showing a comparison in port occupancy when multicasting between a conventional configuration and the embodiment.

FIG. 14 is a diagram showing wavelength allocation (1) in the optical network in FIG. 13.

DETAILED DESCRIPTION OF THE INVENTION

A network according to a best mode (which will hereinafter be termed an embodiment) for carrying out the invention will hereinafter be described with reference to the drawings. Configurations in the following embodiments are exemplifications, and the invention is not limited to the configurations in the embodiments.

First Embodiment

Figure 5:
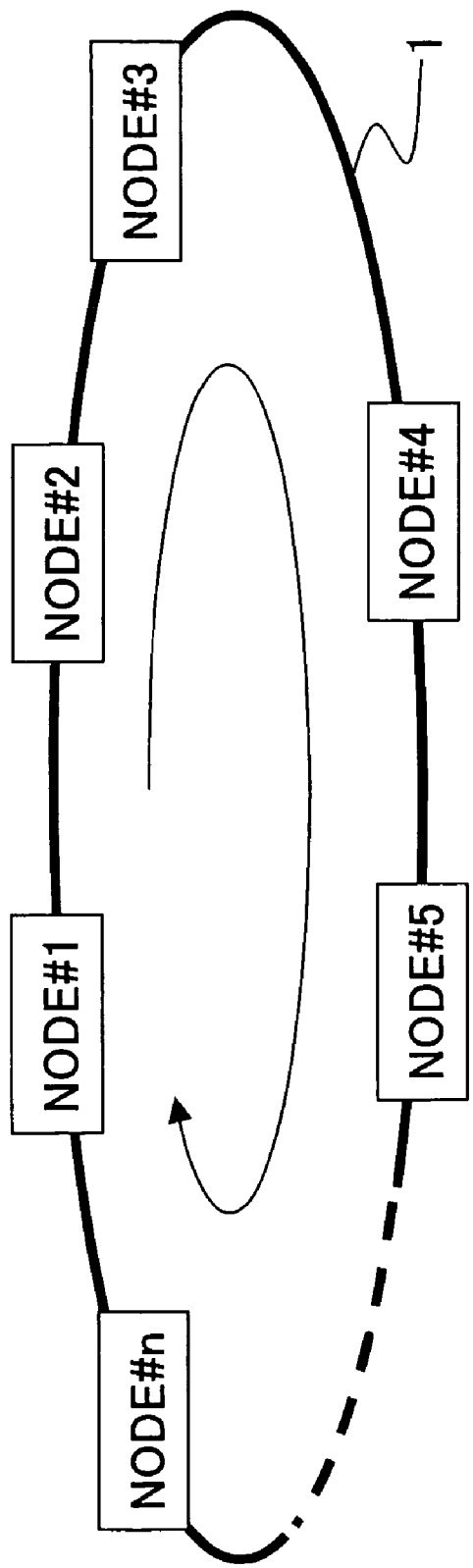
FIG. 5 is a view of a configuration of an optical ring network according to a first embodiment of the invention.

A first embodiment of the invention will be explained with reference to the drawings in FIGS. 5 through 12. Herein, the embodiment of the invention will be discussed by exemplifying an optical ring network. FIG. 5 is a view of a configuration of the optical ring network according to the embodiment. As shown in FIG. 5, the optical ring network includes an optical network medium (which will hereinafter be called a fiber 1) that builds up a ring-configured connection, through which an optical signal flows unidirectionally, and a plurality of nodes #1-#N connected to the fiber 1. In the case of individually identifying each node, the nodes are referred to as the node #1, the node #2, etc. and are, when generically termed, simply called the node. The node includes an optical add/drop multiplexer (multi/demultiplexer) 3 corresponding to an optical add drop apparatus that adds the optical signal to the fiber 1 or demultiplexes the optical signal from the optical fiber 1 (see FIG. 6).

Note that there is any limit neither to an optical ring network control procedure nor to a control configuration thereof in carrying out the invention. For example, each of the nodes in this optical ring network may also be connected to a communication medium different from the fiber 1 through an unillustrated NMS (Network Management System), wherein the communications may be controlled by the NMS.

Further, the respective nodes may also perform autonomous distributed control of the communications across the optical ring network without using this type of MNS. The autonomous distributed control may involve separately providing each node with a port for receiving and transmitting a flux of monitor control light other than a port for receiving and transmitting a signal of information transmitted via the fiber 1 (which is a signal corresponding to user information on the optical ring network). The following discussion deals with neither the configuration of the communication medium employed by the NMS nor a construction of the port for the monitor control light that is used for the autonomous distributed control.

Figure 6:
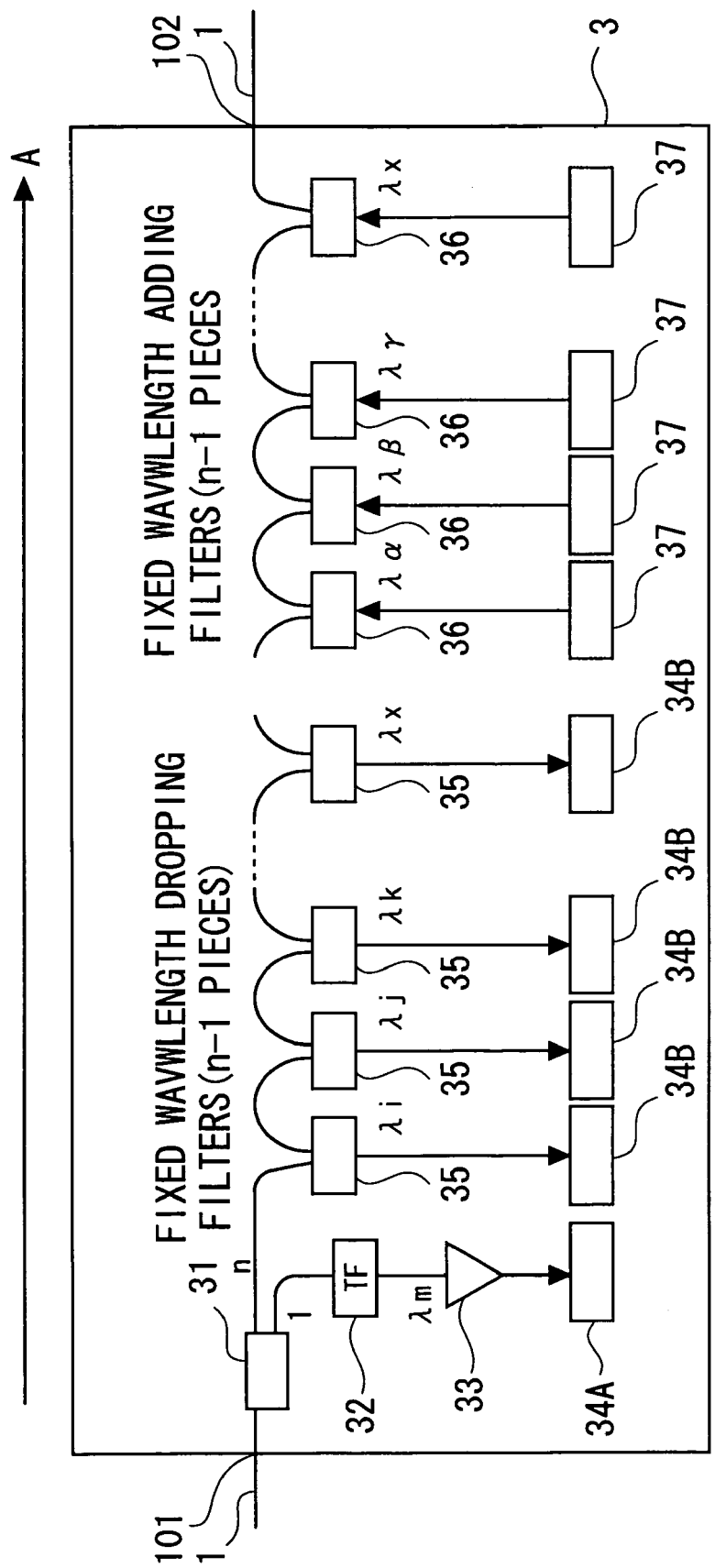
FIG. 6 is a diagram showing a construction of an optical add/drop multiplexer 3 included in the node on the optical network.

FIG. 6 shows a construction of the optical add/drop multiplexer 3 included in each node. As shown in FIG. 6, the optical add/drop multiplexer 3 is connected in series to a transmission path configured by the fiber 1. It is now supposed that the optical signal travels through on the fiber 1 in an arrowhead direction A (a direction from left to right in FIG. 6). In this case, the optical signal on the fiber 1 is inputted to the optical add/drop multiplexer 3 from a left-sided connecting portion (which will hereinafter be referred to as a light receiving end 101) of the optical add/drop multiplexer 3 and passes through respective components of the optical add/drop multiplexer 3, and part of the optical signals are outputted to the fiber 1 from a right-sided connecting portion (which will hereinafter be called a light transmitting end 102) of the optical add/drop multiplexer 3.

As illustrated in FIG. 6, the optical add/drop multiplexer 3 has a 1-to-n (1:n) optical branching coupler 31 (corresponding to a first optical branching unit according to the invention) that branches a flux of wavelength division multiplexed light inputted from the light receiving end 101, an optical tunable filter 32 (corresponding to a variable wavelength drop filter according to the invention), into which one (1-sided) flux of wavelength division multiplexed light branching off at the 1-to-n optical branching coupler 31 is introduced, for demultiplexing (dropping) the optical signal having a wavelength designated by a predetermined wavelength selection signal, an optical amplifier 33 for amplifying the optical signal having the wavelength that is demultiplexed by the optical tunable filter 32, and a light receiving unit 34A for receiving the optical signal amplified by the optical amplifier 33.

The optical add/drop multiplexer 3 further has a plurality of fixed wavelength drop filters 35, to which the other (n-sided) flux of wavelength division multiplexed light branching off at the 1-to-n optical branching coupler 31 is introduced, for demultiplexing the optical signal having a predetermined fixed wavelength from the wavelength division multiplexed light, and a plurality of fixed wavelength add filters 36 for adding the optical signal having the predetermined fixed wavelength to the wavelength division multiplexed light.

As shown in FIG. 6, the fixed wavelength drop filters 35 and the fixed wavelength add filters 36 are provided respectively by pluralities and are connected in series to the fiber 1 serving as the transmission path via the 1-to-n optical branching coupler 31. Further, the plurality of fixed wavelength drop filters 35 demultiplex the optical signals having wavelengths $\lambda i$, $\lambda j$, $\lambda k$, $\lambda x$, etc. different from each other, and transmit these signals respectively to the light receiving units 34B.

Moreover, the plurality of fixed wavelength add filters 36 are connected to light emitting units 37 that generate the optical signals having the wavelengths $\lambda a$, $\lambda \beta$, $\lambda \gamma$, $\lambda \chi$, etc. different from each other, and add the optical signals having the respective wavelengths to the wavelength division multiplexed light. Note that each of the wavelengths $\lambda a, \lambda \beta, \lambda \gamma, \lambda \chi$, etc of the optical signals added by the fixed wavelength add filters 36 is coincident with any one of the wavelengths $\lambda i, \lambda j, \lambda k, \lambda x$, etc. that are demultiplexed respectively by the fixed wavelength drop filters 35. Namely, the optical add/drop multiplexer 3 has the fixed wavelength drop filters 35 and the fixed wavelength add filters 36 in a way that make these filters 35, 36 corresponding to each other with respect to the same wavelengths thereof.

Among the plurality of fixed wavelength add filters 36 connected in series, the fixed wavelength add filter 36 provided at a terminal point (a right-sided and in FIG. 6) has its output port connected to the fiber 1 configuring the transmission path through the light transmitting end 102, and outputs the wavelength division multiplexed light to the fiber 1. Thus, in the embodiment, the 1-to-n optical branching coupler 31, the fixed wavelength drop filters 35 that drop the optical signals respectively having the different wavelengths and the fixed wavelength add filters 36 that add the optical signals respectively having the different wavelengths, are connected in series to the fiber 1, thereby building up part of the transmission path. Note that the fiber 1 is also called the transmission path in the following discussion.

The 1-to-n optical branching coupler 31 has one input port and two output ports, wherein the fiber 1 configuring the input-sided (left-sided in FIG. 6) transmission path is connected to the input port. The 1-to-n optical branching coupler 31 branches off the inputted wavelength division multiplexed light at a power (light intensity) ratio of 1:n. In the embodiment, the 1-to-n optical branching coupler 31, n being given such as n=15, branches off the inputted wavelength division multiplexed light at the power ratio of 1:15.

This type of optical branching coupler is generally constructed of optical waveguides on a substrate. In this case, the power ratio of the light to be branched off is set depending on, for example, sectional areal sizes of the two optical branching waveguides. In this instance, the wavelength division multiplexed light is branched off at 1:n, whereby the optical signals each attenuated at a rate given by 14/15=0.93, i.e., attenuated by 0.3 dB are transmitted to the fixed wavelength drop filters 35 configured in series to the transmission path.

The optical tunable filter 32 can involve using a wavelength selection filter (Acousto-Optic Tunable Filter; AOTF) utilizing an acousto-optic effect based on a surface acoustic wave (SAW), a filter that selects a pass-through wavelength by controlling a temperature with a combination of a Peltier element and a ring resonator, an MEMS filter (Micro Electronics Mechanical Systems Filter) that selects a pass-through wavelength by mechanically controlling hyperfine mirrors built up on a semiconductor substrate, and so on. The embodiment of the invention is not, however, limited to the construction of the optical tunable filter 32.

The optical amplifier 33 amplifies the light having the wavelength selected by the optical tunable filter 32. Accordingly, differently from a case of broadband amplification in which the wavelength division multiplexed light inputted from the fiber 1 is amplified, it may be sufficient that the optical amplifier 33 can amplify the optical signal in a comparatively narrow band.

The light receiving unit 34A (and 34B) converts the inputted light into an electric signal and transmits the signal to an information processing device (e.g., a router, a computer, etc.) connected to the node. The light receiving unit 34A is a photodiode, a phototransistor, etc. On the other hand, the light emitting unit 37 is a light emitting diode or the like.

The fixed wavelength drop filter 35 and the fixed wavelength add filter 36 can involve using dielectric multi-layered filters, fiber Bragg gratings and so on.

Given hereafter is an explanation of a case of using the dielectric multi-layered filters serving as the fixed wavelength drop filter 35 and the fixed wavelength add filter 36. The fixed wavelength drop filter 35 has a common input port and two output ports. Further, the fixed wavelength add filter 36 has a common signal input port, a single wavelength input port, and a common signal output port.

The fixed wavelength drop filter 35 that demultiplexes, for example, the wavelength $\lambda i$ will be explained. When the wavelength division multiplexed light is inputted to the input port of the fixed wavelength drop filter 35, in the flux of the wavelength division multiplexed light, the optical signals exhibiting an intensity characteristic that takes substantially a nest-ridged distribution with the optical signal wavelength $\lambda i$ being as a central wavelength, are selected and outputted from a first output port.

Further, in the flux of the wavelength division multiplexed light, the optical signals exhibiting such a characteristic as to be cut off in a substantially nest-ridged shape with the optical signal wavelength $\lambda i$ being as the central wavelength, are outputted from a second output port. In this case, the attenuation rate of the optical signal with the wavelength that is sufficiently away from the cut-off wavelength $\lambda i$ is on the order of approximately 0.25 dB.

The fixed wavelength add filter 36 that adds, e.g., the wavelength $\lambda i$ will be described. When the wavelength division multiplexed light is inputted to the common input port of the fixed wavelength add filter 36, in the wavelength division multiplexed light, the optical signals having the characteristic that is cut off in the substantially nest-ridged shape with the light wavelength $\lambda i$ being the central wavelength, are outputted from the common output port. Further, at this time, when the optical signal having the wavelength $\lambda i$ is inputted from the signal wavelength input port, the optical signal is added as it is to the wavelength division multiplexed light at the common output port.

Thus, the optical add/drop multiplexer 3, before adding the optical signal having the predetermined wavelength $\lambda i$ to the wavelength division multiplexed light, at first demultiplexes the light having this wavelength through the fixed wavelength drop filter 35. As a result, the optical signal having this wavelength $\lambda i$ in the wavelength division multiplexed light on the side of the second output port connected in series to the transmission path, is cut off by the cut-off characteristic taking the substantially nest-ridged shape. Moreover, in the fixed wavelength add filter 36, the light having the wavelength $\lambda i$ also in the wavelength division multiplexed light transmitted to the common output port from the common input, is cut off by the characteristic taking the substantially nest-ridged shape.

Thus, in the optical add/drop multiplexer 3, the fixed wavelength drop filter 35 that drops the wavelength $\lambda i$ is combined with the fixed wavelength add filter 36 that adds the wavelength $\lambda i$, whereby the optical signal having the wavelength $\lambda i$ in the wavelength division multiplexed light inputted from the transmission path (the fiber 1 on the left side in FIG. 6) on the side of the light receiving end 101, is effectively cut off by the two cut-off filters. The two cut-off filters are effectively applied, whereby cut-off performance (which is a ratio of outgoing light power to incident optical power on the basis of the central wavelength $\lambda i$) exceeding 30 dB can be obtained.

Therefore, the optical signal having the wavelength $\lambda i$, which is inputted to and demultiplexed by the optical add/ drop multiplexer 3, is substantially completely terminated by the optical add/drop multiplexer 3, and optical add/drop multiplexer 3 can reuse the optical signal having the same wavelength $\lambda i$ and can output the optical signal to the transmission path on the output side (the right side in FIG. 6). Namely, the optical add/drop multiplexer 3 is capable of reducing a coherent cross-talk (interference between the signals having the same wavelength, which is caused when the input-sided wavelength is not completely cut off but leaks out on the output side) occurred in a conventional system that reuses the wavelength. The characteristics given above are the same also with the wavelengths $\lambda j$, $\lambda k$, etc. other than $\lambda i$.

Thus, in the wavelength division multiplexed light branching off at the 1-to-n optical branching coupler 31, the optical signals having the wavelengths $\lambda i$, $\lambda j$, $\lambda k$, $\lambda x$ corresponding respectively to the plurality of fixed wavelength drop filters 35 are demultiplexed and terminated by these fixed wavelength drop filters 35, and at the same time it follows that the flux of light having the wavelengths $\lambda i$, $\lambda j$, $\lambda k$, $\lambda x$ corresponding respectively to the plurality of fixed wavelength add filter 36 is sent by these fixed wavelength add filters 36 in order to transmit different pieces of information.

Note that the 1-to-n optical branching coupler 31 and the plurality of fixed wavelength drop filters 35 exist on a route extending from the fiber 1 to the light receiving units 34B. The attenuation rate of the optical signal having the wavelength that is sufficiently away from the cut-off wavelength $\lambda i$ in the fixed wavelength drop filter 35 is on the order of about 0.25 dB, and hence, even when, for example, the fixed wavelength drop filters 35 are connected in series at 10 stages, the attenuation comes to 2.5 dB. Therefore, even in such a case that the specified wavelengths are demultiplexed from the wavelength division multiplexed light branching off on the n-side at the 1-to-n optical branching coupler 31 by the fixed wavelength drop filters 35 connected in series, the optical signals with the demultiplexed wavelengths can be introduced directly to the light receiving units 34B without being amplified.

Figure 7:
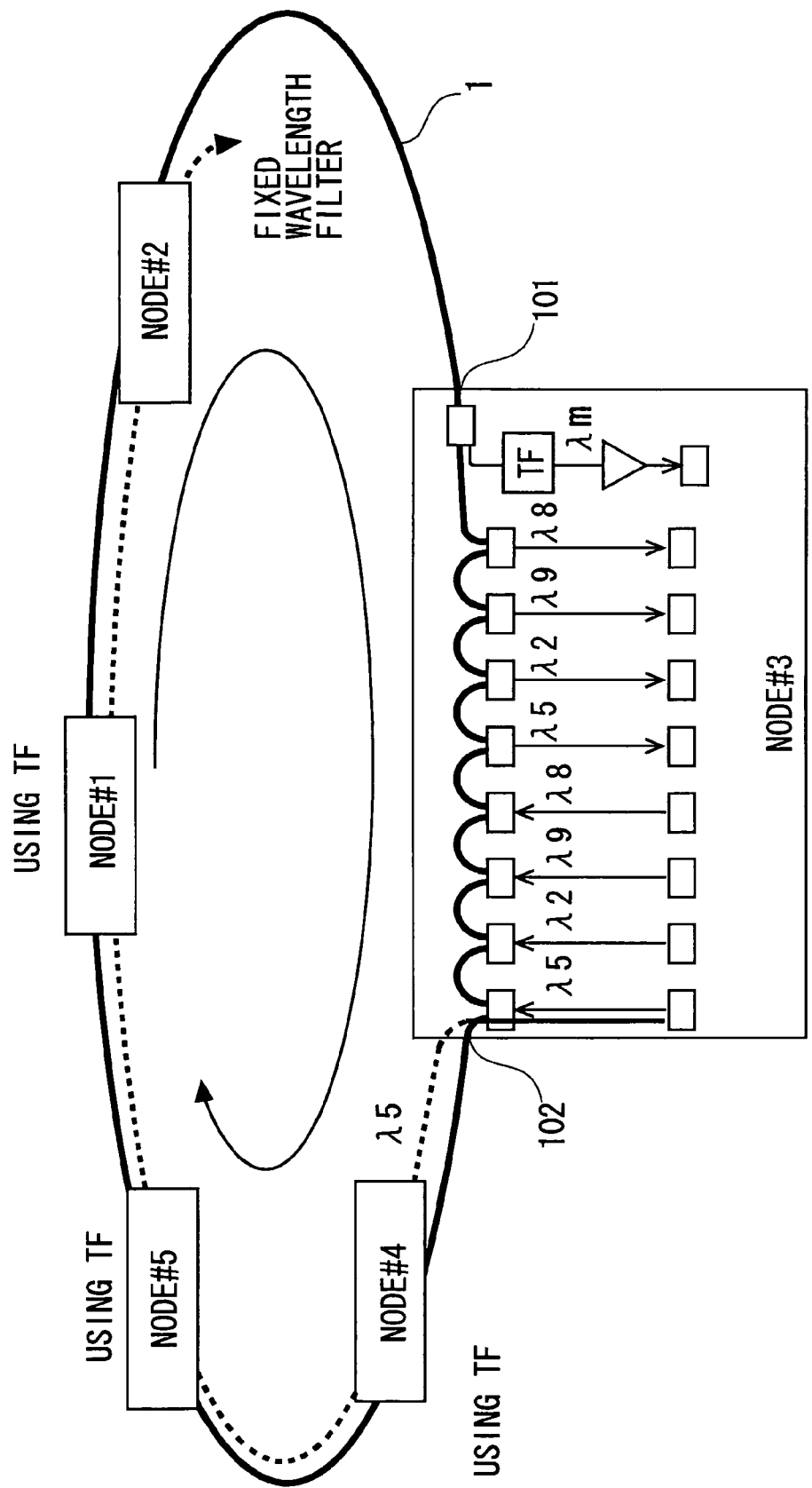
FIG. 7 is an explanatory view of a multicast procedure through on optical signals having the same wavelength on the optical network.

An associated relation between the nodes and the wavelengths in the optical ring network will be explained referring to FIGS. 7 and 8. FIG. 7 is an explanatory view of a multicast procedure through on the optical signals having the same wavelength in the optical network. FIG. 8 is a diagram showing the associated relation between the nodes and the wavelengths in the optical ring network in FIG. 7.

In a table in FIG. 8, respective rows separated in a direction of the vertical axis represent optical signal transmitting nodes indicated by #1 through #5. Further, respective columns separated in a direction of the horizontal axis represent optical signal receiving nodes indicated by #1 through #5. Then, the wavelength of the optical signal that is used between the transmitting node and the receiving node is entered in each of entries corresponding to intersecting points between the respective rows separated in the vertical axis and the respective columns separated in the horizontal axis. For instance, the wavelength of the optical signal transmitted from the node #1 and received by the node #2 is $\lambda\mathbf{1}$.

A feature point in the embodiment is that the same wavelength is employed for node-to-node bidirectional communications, i.e., the wavelength is reused. For example, the wavelength of the optical signal transmitted from the node #2 and received by the node #1 is $\lambda\mathbf{1}$. Accordingly, the same wavelength $\lambda\mathbf{1}$ is used on the route extending from the node #1 to the node #2 and on the route extending from the node #2 to the node #1. This is the same also between other nodes. Even by this sort of reuse of the wavelength, the cross-talk is sufficiently reduced by the cut-off characteristic of the wavelength with the combination of the fixed wavelength drop filter 35 and the fixed wavelength add filter 36 as explained in FIG. 6.

As a result, the number of the nodes configuring the network is n, while the number of light sources required for configuring the network taking a full-mesh topology is given by n(n−1), however, n(n−1)/2 suffices as the number of wavelengths. Namely, the number of wavelengths employed in the whole optical ring network can be halved. As a result, it is possible to set a doubled-number of channels (simultaneously set combinations of the communicable nodes) as compared with the case in which the wavelength is not reused within the same optical amplifier band as by the conventional method even when amplifying the wavelength division multiplexed light.

FIG. 9 shows the number of nodes configuring the network and the number of wavelengths used for each node to simultaneously actualize a one-to-one communication that is a so-called full-mesh-configured communication. FIG. 9 shows a difference in the necessary number of wavelengths between the method that does not reuse the wavelength and an example (present example) of the embodiment. In the case of the amplifier using an erbium doped fiber, an amplification band is 40 nm of 1530 nm through 1570 nm. When laying out fluxes of light having different wavelengths at an interval of 0.8 nm as fluxes of wavelength division multiplexed light, approximately 50 waves having the different wavelengths can be used. Assuming so, as shown in FIG. 9, in the wavelength non-reuse case, a limit of the amplification is on the order of 42 waves when seven (7) pieces of nodes are provided. By contrast, the present configuration makes it possible to configure the optical ring network having up to 45 waves when ten (10) pieces of nodes are provided.

Herein, a filter arrangement within the optical add/drop multiplexer 3 will be explained. On the occasion of arranging the filters within the optical add/drop multiplexer 3 in the embodiment, for minimizing a transmission loss, the fixed wavelength drop filters 35 are arranged on the input side (which is, within the node #3 in FIG. 7, the side of the light receiving end 101 as the connection end with the fiber 1 on the side of the node #2), and the fixed wavelength drop filters 36 are arranged on the output side (which is, within the node #3 in FIG. 7, the side of the light transmitting end 102 as the connection end with the fiber 1 on the side of the node #4).

Moreover, as for an arrangement sequence of the fixed wavelength drop filters 35, the fixed wavelength drop filters 35 are arranged in close proximity to the light receiving end 101 on the input side of the fiber 1 in the sequence from the filter that drops the wavelength transmitted from the remotest node on the network topology as viewed from the self-node. Further, an arrangement sequence of the fixed wavelength add filters 36 is that the fixed wavelength add filters 36 are arranged in close proximity to the light transmitting end 102 on the output side in the sequence from the filter that adds the wavelength to be transmitted to the remotest node on the network topology as viewed from the self-node.

Namely, the remoter node has a longer transmission distance and a larger attenuation quantity of the optical signal, and therefore the receiving side receives earlier the optical signal having the wavelength from the remoter node and receives later the optical signal having the wavelength from the closer node. As a result, the number of the fixed wavelength drop filters 35 through which the optical signal from the remoter node passes till demultiplexed within the optical add/drop multiplexer 3, is less than the number of the filters through which the optical signal from the closer node passes, whereby a loss due to the passage through the wavelength drop filters 35 can be decreased.

Further, the optical signal from the closer node is short in its transmission distance and is small in its attenuation quantity, and hence the number of the fixed wavelength drop filters 35 through which the optical signal passes till demultiplexed within the optical add/drop multiplexer 3, is set larger than the number of the filters through which the optical signal from the remoter node passes.

Moreover, the transmitting side adds the optical signal having the wavelength to the closer node in a remoter position from the light transmitting end 102, and also adds the optical signal having the wavelength to be transmitted to the remoter node in a closer position to the light transmitting end 102. As a consequence, the number of the fixed wavelength add filters 36 through which the optical signal to the remoter node passes till sent to the fiber 1 within the optical add/drop multiplexer 3, becomes smaller than the number of the filters through which the optical signal to the closer node passes, and the loss of the intensity of the optical signal to be sent decreases. Moreover, the number of the fixed wavelength add filters 36 through which the optical signal to the closer node passes till added to the fiber 1 within the optical add/drop multiplexer 3, is set larger than the number of the filters through which the optical signal to the remoter node passes.

Herein, the multicast procedure in the embodiment will be described with reference to FIG. 7. Now, attention is focused on the node #3. The node #3 uses $\lambda 2$, $\lambda 5$, $\lambda 8$ and $\lambda 9$ as wavelengths of the optical signals transmitted and received between the nodes #1, #2, #4 and #5. Accordingly, the filters capable of dropping and adding $\lambda 2$, $\lambda 5$, $\lambda 8$ and $\lambda 9$ are respectively arranged in the optical add/drop multiplexer 3 of the node #3.

As already explained in FIG. 6, the optical add/drop multiplexer 3 has the wavelength tunable filter 32 at the port on the side of the power "1" when the intra-ring wavelength division multiplexed light is branched off at the 1-to-n optical branching coupler 31. On the other hand, in the network topology, the nodes are arranged in the sequence such as from #1 to #5, and the optical signal travels in a direction such as #1, #2, #3, #4, #5. Accordingly, in this configuration, the node #2 is disposed in the remotest position as viewed from the Node #3.

In the optical ring network, when the node #3 performs multicasting, there is employed the wavelength $\lambda 5$ to be transmitted to the node #2 existing in the remotest position, and other nodes in the closer positions than the node #2 receive $\lambda 5$, thus effecting the multicasting. The node #2 has the fixed wavelength drop filters 35 for (corresponding to) $\lambda 1$, $\lambda 5$, $\lambda 6$, $\lambda 7$, and therefore the optical signal transmitted from the node #3 is received by the fixed wavelength drop filter 35 for $\lambda 5$.

While on the other hand, none of the nodes #1, #4, #5 have the fixed wavelength drop filter 35 for $\lambda 5$, and hence presetting is done so that $\lambda 5$ is received by the wavelength tunable filter 32 when the node #3 performs the multicasting. The setting of the wavelength tunable filter 32 may also be done by, e.g., a control signal given from an unillustrated NMS. Further, the node #3 may give a flow of monitor control light via the fiber 1 and may instruct the nodes #1, #4, #5 to set the wavelength tunable filter 32.

With this setting, the node #3, which performs the multicasting, can multicast by use of one wavelength, and an occupied quantity of the fixed wavelength drop filters 35 and the fixed wavelength add filters 36 of each of the nodes configuring the full-mesh topology, can be restrained, whereby a port occupancy can be reduced.

Figure 1:
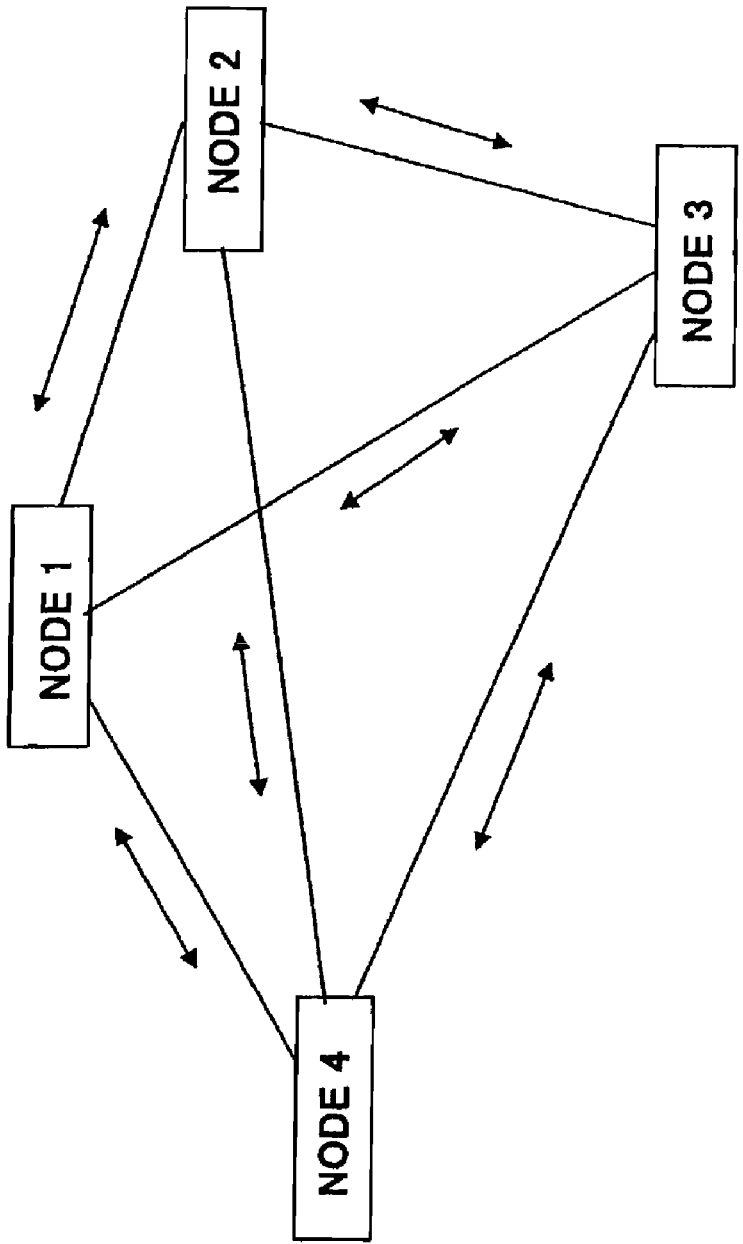
FIG. 1 is a view showing an example of a network physically taking a full-mesh configuration.
Figure 2:
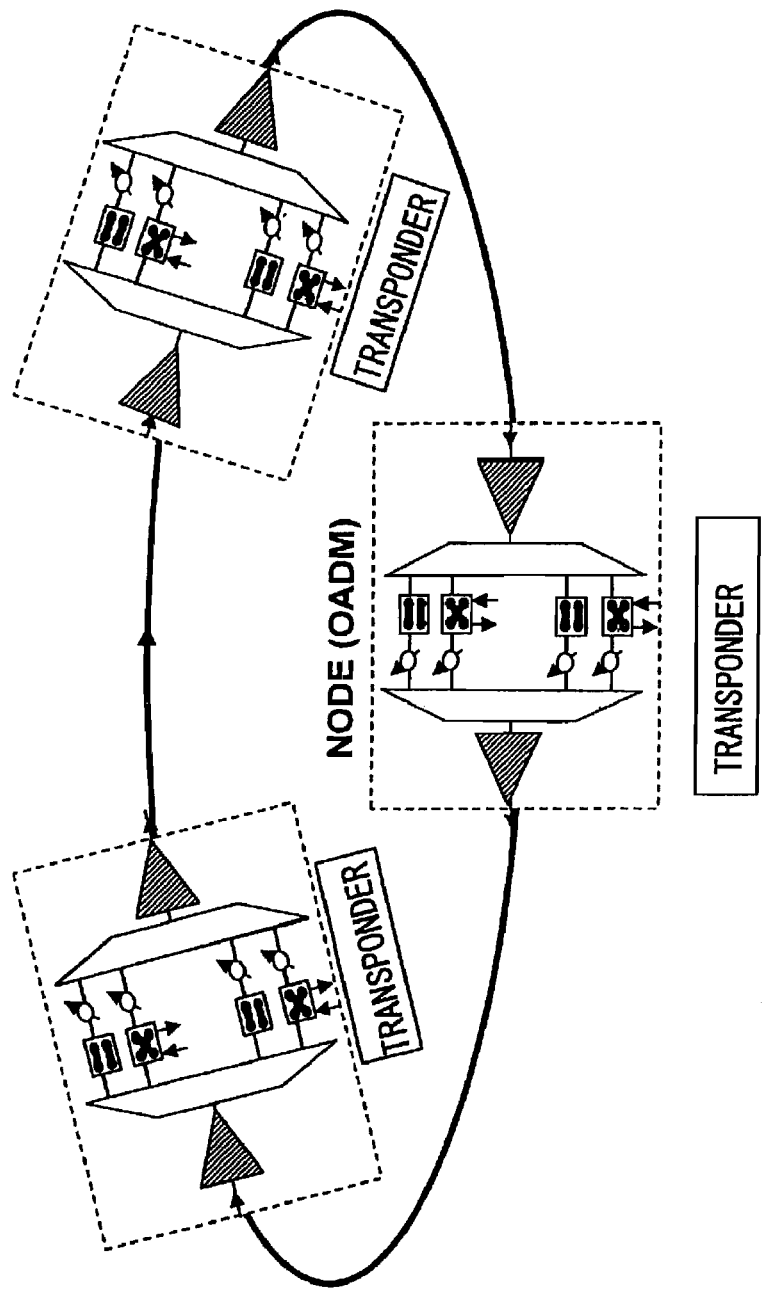
FIG. 2 is a view showing an example of a full-mesh network defined physically as a ring network but logically enabling a plurality of nodes to be connected simultaneously.
Figure 3:
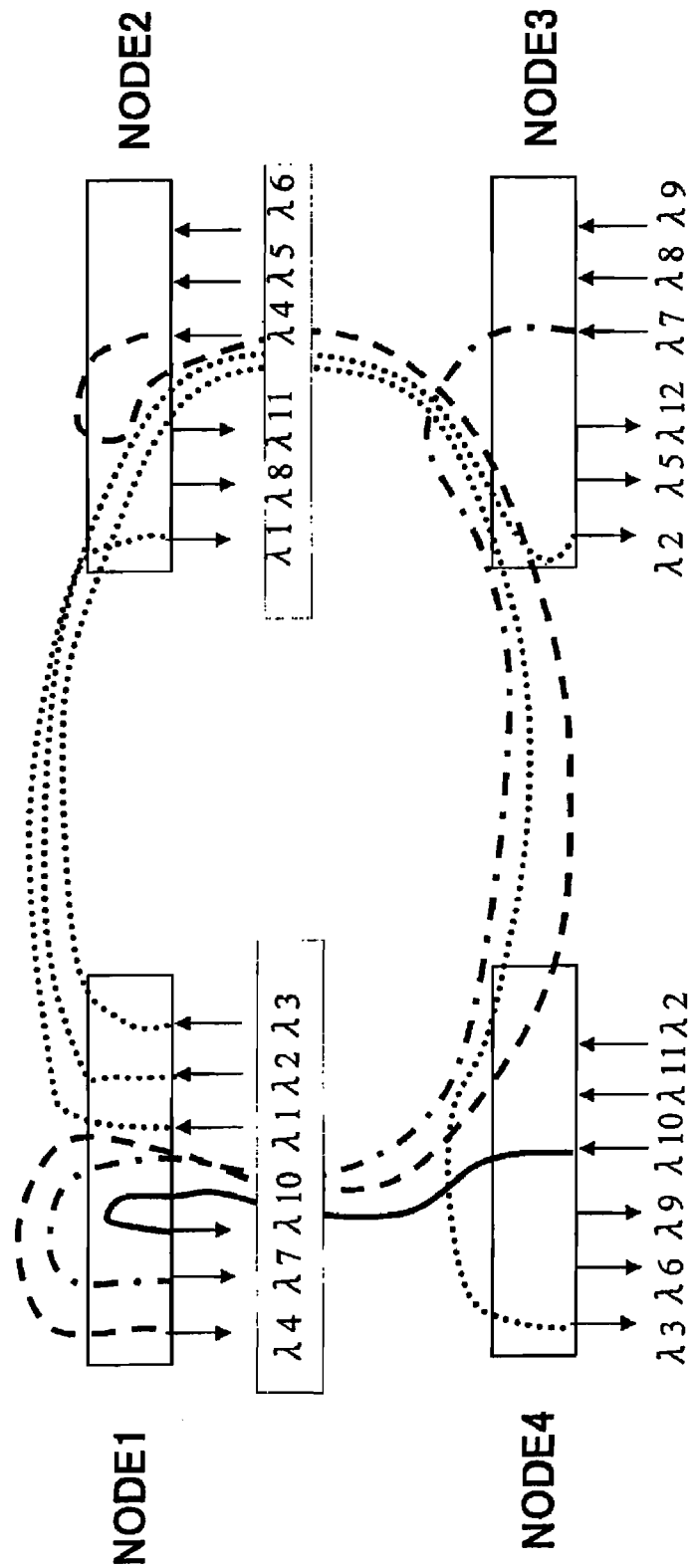
FIG. 3 is a diagram showing an example (1) of multicast in which one node transmits the same information to other plural nodes on an optical network.
Figure 4:
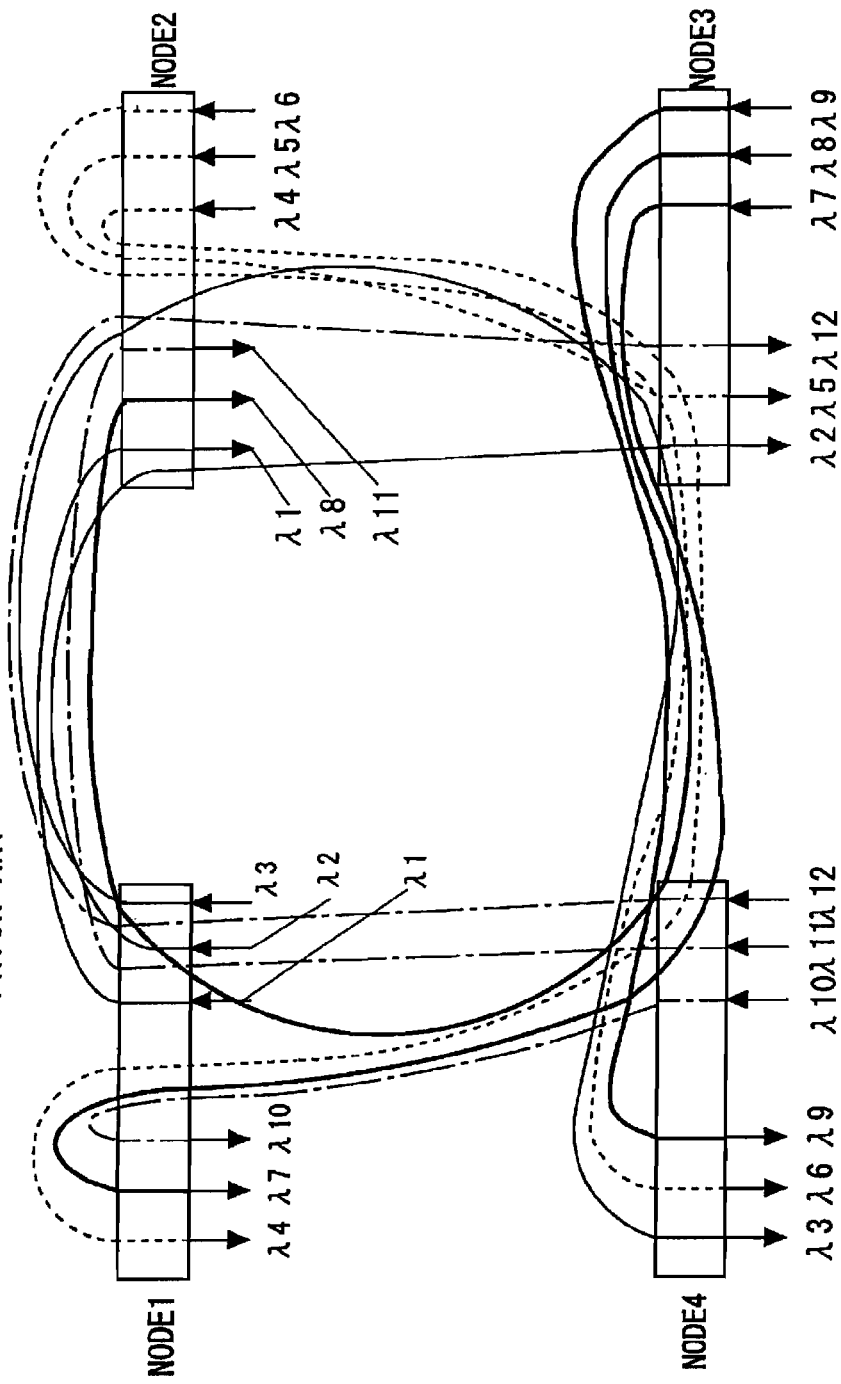
FIG. 4 is a diagram showing an example (2) of the multicast in which one node transmits the same information to the other plural nodes on the optical network.

In the optical ring network according to the embodiment, corresponding to a number "N" of the nodes connected to the optical ring network, each node requires N-pieces of ports consisting of the fixed wavelength drop filters 35 and the fixed wavelength add filters 36 to enable the full-mesh-configured communications. Then, it follows that each port is occupied in the proportion of 1/N by multicasting. FIG. 10 shows a comparison in the port occupancy by multicasting between the conventional configuration (which is the case in FIG. 3 or FIG. 4) and the embodiment (shown by way of the example). As shown in FIG. 10, the method in the embodiment becomes more advantageous as the number "N" of the nodes on the optical ring network gets more increased.

Figure 11:
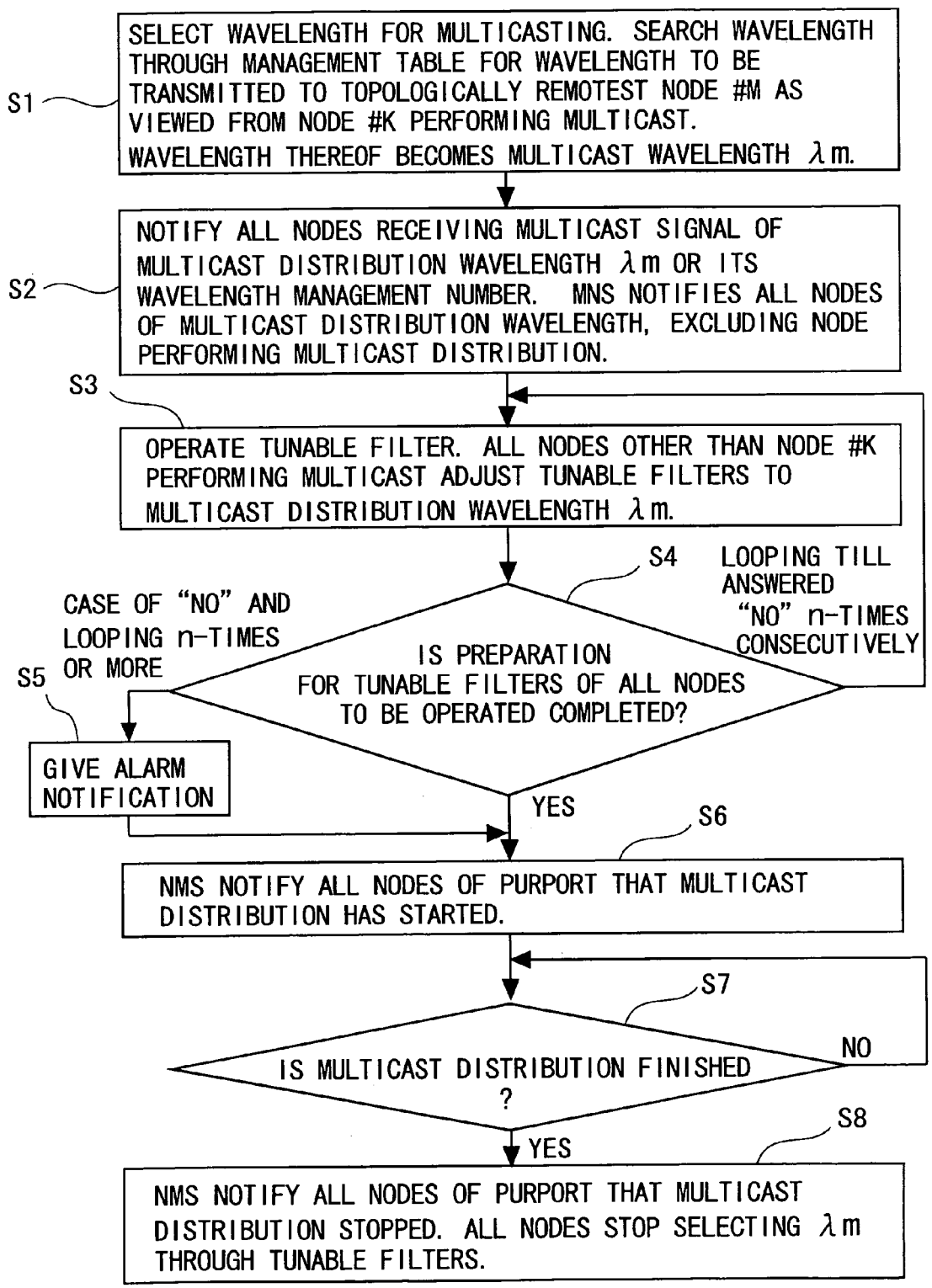
FIG. 11 is a flowchart showing a processing flow in the case of performing multicast distribution through on the optical signals in the optical ring network.

FIG. 11 shows a processing flow in the case of distribution by multicasting through on the optical signals in the optical ring network. In the embodiment, the nodes configuring the optical ring network and the NMS managing the optical ring network execute a predetermined control program, thereby actualizing this processing.

In this processing, for example, a user device (a host computer, etc.) connected to any one of nodes #K makes a request for transmitting the information by multicasting. Then, the node #K that connects this user device to the optical ring network requests the NMS managing the optical ring network to set the multicast distribution. The MNS requested to set the multicast distribution refers to a wavelength management table and searches for a node #M that is remotest from the node #K, thus obtaining a wavelength of the optical signal transmitted to the node #M (S1). This wavelength becomes a wavelength $\lambda m$ used for the multicast distribution. Note that the wavelength management table is a table for managing the network topology and the wavelengths used in the network. The wavelength management table is structured such that each of the nodes has a plurality of entries recorded, together with (as specified by) a node identifier, with wavelengths used for the communications with communication partner nodes connected to the node concerned in the topological sequence from the node concerned.

Next, the NMS notifies, of the multicast wavelength $\lambda m$ or a wavelength management number thereof, the node (which is the node located between the node #K and the node #M in the remotest position from the node #K) receiving the multicast signal, and makes a request for setting the optical tunable filter 32 (S2).

Each node receiving the multicast wavelength $\lambda m$ or the wavelength management number thereof sets the optical tunable filter 32 for the wavelength $\lambda m$ (S3). The node that completes the setting of the optical tunable filter 32 sends a completion report to the NMS.

The NMS checks whether preparation for the optical tunable filters 32 of all the nodes that should be operated is completed or not (S4).

If a completion report saying that the preparation for the optical tunable filters 32 has been completed is not reached from all the nodes, the NMS re-executes the process in S3 as retrying for the nodes with the completion report unreached. Then, in the case of executing the process in S3 in loop by a predetermined retry count, the NMS gives alarm notification (S5).

When the preparation for the optical tunable filters 32 of all the nodes is completed, the NMS notifies all the nodes that the multicast distribution is to be started (S6). The multicast request node #K instructs the user device to start the multicast distribution, thereby starting the multicast distribution.

The user device that requests the transmission of the information by multicasting, upon finishing the multicast distribution, transmits an end signal to the node #K. The node #K monitors whether the end signal is received or not (S7). When receiving the end signal, the node #K judges that the multicast distribution has been completed, and notifies the NMS of this purport. Then, the MNS notifies each node of a purport that the multicast distribution is completed. Each node cancels the setting of λm in the optical tunable filter 32 (S8).

As described above, in the optical ring network in the embodiment, the optical add/drop multiplexer 3 of each node has the I/O ports, consisting of the fixed wavelength drop filters 35 and the fixed wavelength add filters 36, of which the number corresponds to the number of communication partner nodes, whereby the full-mesh network capable of communicating with the respective node simultaneously can be configured.

Further, the optical add/drop multiplexer 3 has the optical tunable filter 32, whereby the optical signals for the communications between other two nodes different from the node concerned can be demultiplexed. Therefore, the optical signal having the wavelength λm used for the communications between the specified node #K and the node #M existing in the remotest position in topology from the node #K, can be used for the multicast distribution. Namely, the other node located between the node #K and the node #M captures this λm optical signal, whereby the multicast distribution from the node #K can be actualized. In this case, in each of the nodes on the optical ring network, only one port is used for the multicast distribution or receiving the multicast distribution from one node, so that the ports for executing the communications other than the multicast communications are sufficiently maintained.

Moreover, in this optical add/drop multiplexer 3, one single 1-to-n optical branching coupler 31, the fixed wavelength drop filters 35 of which the number corresponds to the number of the communication partner nodes, and the fixed wavelength add filters 36 of which the number corresponds to the number of the communication partner nodes, are connected in series on the route along which the wavelength division multiplexed light is inputted from the transmission path (on one side) and is again outputted to the transmission path (on the other side). In this instance, when set approximately by n=15, the intensity of the wavelength division multiplexed light at the 1-to-n optical branching coupler 31 decreases by about 0.3 dB.

Further, generally, in the wavelength division multiplexed light incident upon the fixed wavelength drop filter 35 or the fixed wavelength add filter 36, a decrease in the intensity of a non-demultiplexed wavelength segment (the wavelength in the area sufficiently apart from the cut-off wavelength) is on the order of 0.24 dB. Moreover, the optical signal dropped by the fixed wavelength drop filter 35 is introduced directly into the light receiving unit 34. Furthermore, the optical signal from the light emitting unit 37 is introduced directly into the fixed wavelength add filter 36.

Therefore, for example, even in the optical add/drop multiplexer 3 taking a 5-port configuration that involves combining the fixed wavelength drop filters 35 and the fixed wavelength add filters 36, a decrease in the intensity of the wavelength division multiplexed light can be retrained down to 3 dB (on the assumption that there be provided in the worst case 10 stages of combinations of the fixed wavelength add filters 36 and the fixed wavelength drop filters 35). The light receiving unit 34B can receive, with a sufficient intensity, the optical signal demultiplexed by the fixed wavelength drop filter 35. Further, the optical signal outputted from the fixed wavelength add filter 36 can be transmitted with the sufficient intensity to other nodes. As a result, the optical add/drop multiplexer 3 having this configuration has no necessity of amplifying the wavelength division multiplexed light traveling through the route in series to the transmission path, whereby an expensive WDM amplifier can be saved. Further, there is also no necessity of amplifying the output signal of the fixed wavelength drop filter 35 that has demultiplexed the specified wavelength.

Moreover, the optical add/drop multiplexer 3 builds up one I/O port by using the fixed wavelength drop filter 35 that drops the optical signal having the predetermined wavelength λ and the fixed wavelength add filter 36 that adds the optical signal having this wavelength λ. Accordingly, the optical signal having the wavelength λ, which is dropped and added in the optical add/drop multiplexer 3, is subjected to the filter operation substantially twice, and the cut-off performance (which is a ratio of the outgoing light power to the incident light power at the central wavelength λi) exceeding 30 dB, can be acquired. Hence, the optical add/drop multiplexer 3 can reuse the optical signal with the dropped wavelength λ for the transmission to the next node, whereby the so-called reuse of the wavelength can be attained and at the same time the coherent cross-talk can be reduced.

Note that the embodiment has exemplified how the multicast distribution is controlled by use of the NMS (see FIG. 11). The embodiment of the invention is not, however, limited to the configuration and the procedure given above. For instance, the procedure (the processes in the flow in FIG. 11) can be carried out as it is also in such a case that each of the nodes on the network performs the control in linkage with other nodes in an autonomous distributed control manner using the monitor control light. In this case, the respective nodes may share the network topology information and the wavelength management table for managing the wavelengths employed between the nodes.

For example, to begin with, the user device (the host computer, etc.) connected to any one of the nodes #K requests the transmission of the information by multicasting. Then, the node #K that connects this user device to the optical ring network refers to the wavelength management table and sees a node #M that is remotest from the node #K, thus obtaining a wavelength λm for this node #M. Then, the node #K may instruct other nodes to set λm in the optical tunable filter 32 by using the monitor control light.

Figure 12:
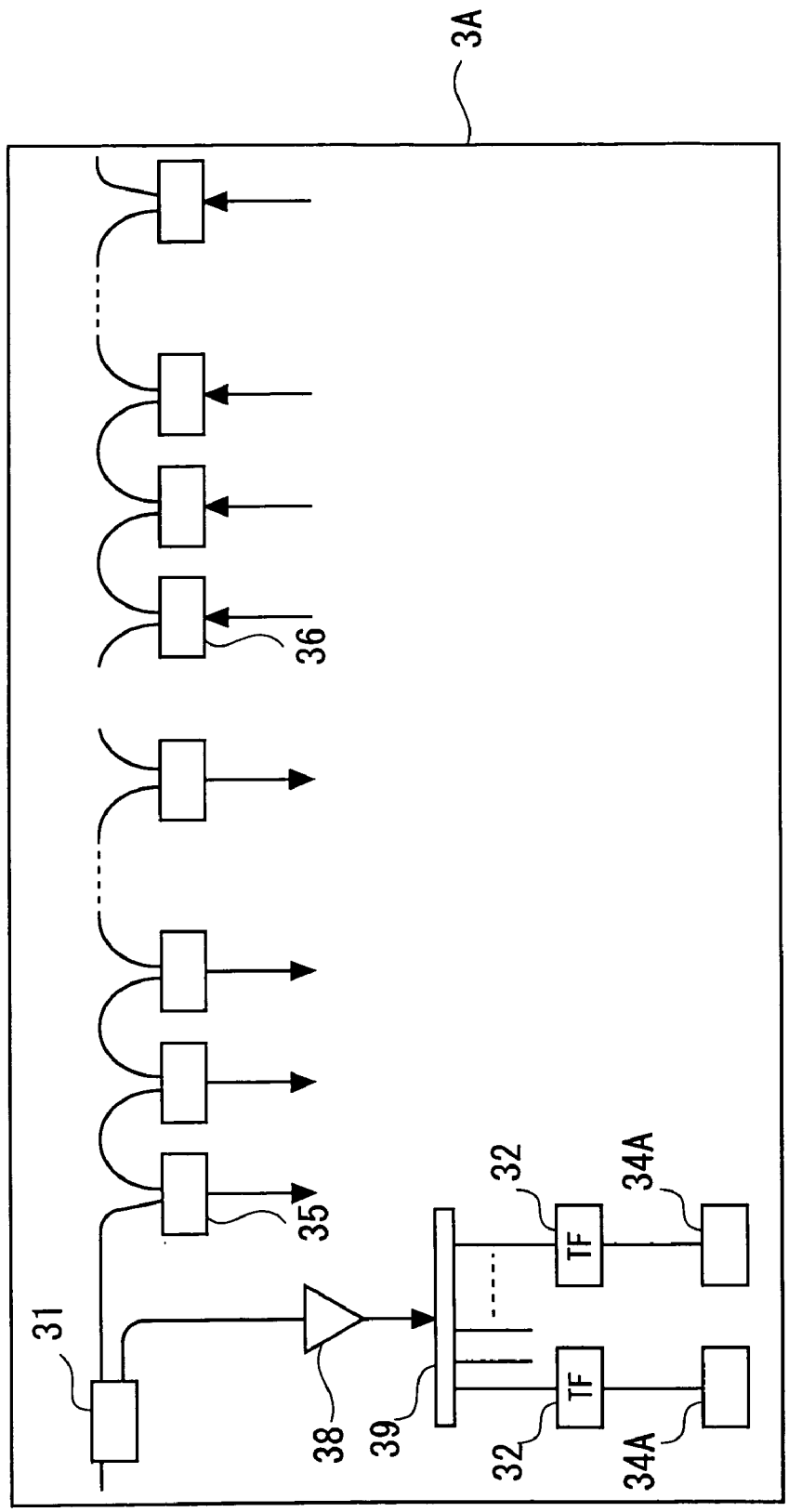
FIG. 12 is a diagram showing an example of a construction of the optical add/drop multiplexer including a plurality of optical tunable filters.

Further, the embodiment has exemplified the use of the single optical tunable filter 32. In the embodiment of the invention, however, the number of the optical tunable filter 32 is not limited to "1". FIG. 12 shows an example of a configuration of the optical add/drop multiplexer 3 including the plurality of optical tunable filters 32.

In this example, the wavelength division multiplexed light branching off from the 1-to-n optical branching coupler 31 is amplified by the WDM amplifier 38 and introduced into a multiply-1-by-n (1×n) optical branching coupler 39 (corresponding to a third optical branching unit according to the invention). The 1×n optical branching coupler 39 branches the introduced wavelength division multiplexed light into n-fluxes of wavelength division multiplexed light. The branched-fluxes of wavelength division multiplexed light are introduced into the optical tunable filters 32 different from each other. Each of the optical tunable filters 32 selects and transmits the light having a specified wavelength to a light receiving unit 34A. Other configurations are the same as those in the optical add/drop multiplexer 3 shown in FIG. 6, and hence their explanations are omitted herein.

As described above, in the configuration in FIG. 12, the WDM amplifier 38 amplifies the wavelength division multiplexed light, and thereafter the 1×n optical branching coupler 39 branches the amplified light into the n-fluxes of wavelength division multiplexed light. With this configuration, the intensity of the optical signal after being branched off is kept at a predetermined or higher level. Further, the fluxes of wavelength division multiplexed light after being branched off are introduced into the plural optical tunable filters 32, thus enabling the optical signals having wavelengths different from each other to be selected. This configuration makes it possible to increase the number of paths (channels) for simultaneously receiving the multicast distribution.

Second Embodiment

A second embodiment of the invention will be described with reference to FIGS. 13 through 15. The first embodiment has shown the example, wherein the node on the optical ring network is constructed by use of the plurality of fixed wavelength drop filters 35, the plurality of fixed wavelength add filters 36 and one or more optical tunable filters 32. Further, in the first embodiment, the optical signal of the wavelength that is received by each node on the optical ring network is reused, and the multicast distribution is actualized by the optical signal of the wavelength used for the communication with the node existing in the remotest position in topology of the optical ring network from the node concerned.

In the second embodiment, an optical network taking a bus type is configured by use of the plurality of fixed wavelength drop filters 35, the plurality of fixed wavelength add filters 36 and one or more optical tunable filters 32. In this case, unlike the node configuration in the ring topology, in the bus topology network, the optical signals are transmitted bidirectionally through one fiber, and hence, even when different in direction, the optical signals having the same wavelength can not be used in the same segment on the fiber. Therefore, the wavelengths to be dropped and added are not necessarily paired. For this reason, according to the second embodiment, the combinations of the fixed wavelength drop filters and the fixed wavelength add filters and the node configuration are different from those in the case of the ring network.

Other constructions and operations in the second embodiment are the same as those in the case of the first embodiment. Such being the case, the same components are marked with the same numerals as those in the first embodiment, and their explanations are omitted. Further, the drawings in FIGS. 1 through 12 are referred to according to the necessity.

Figure 13:
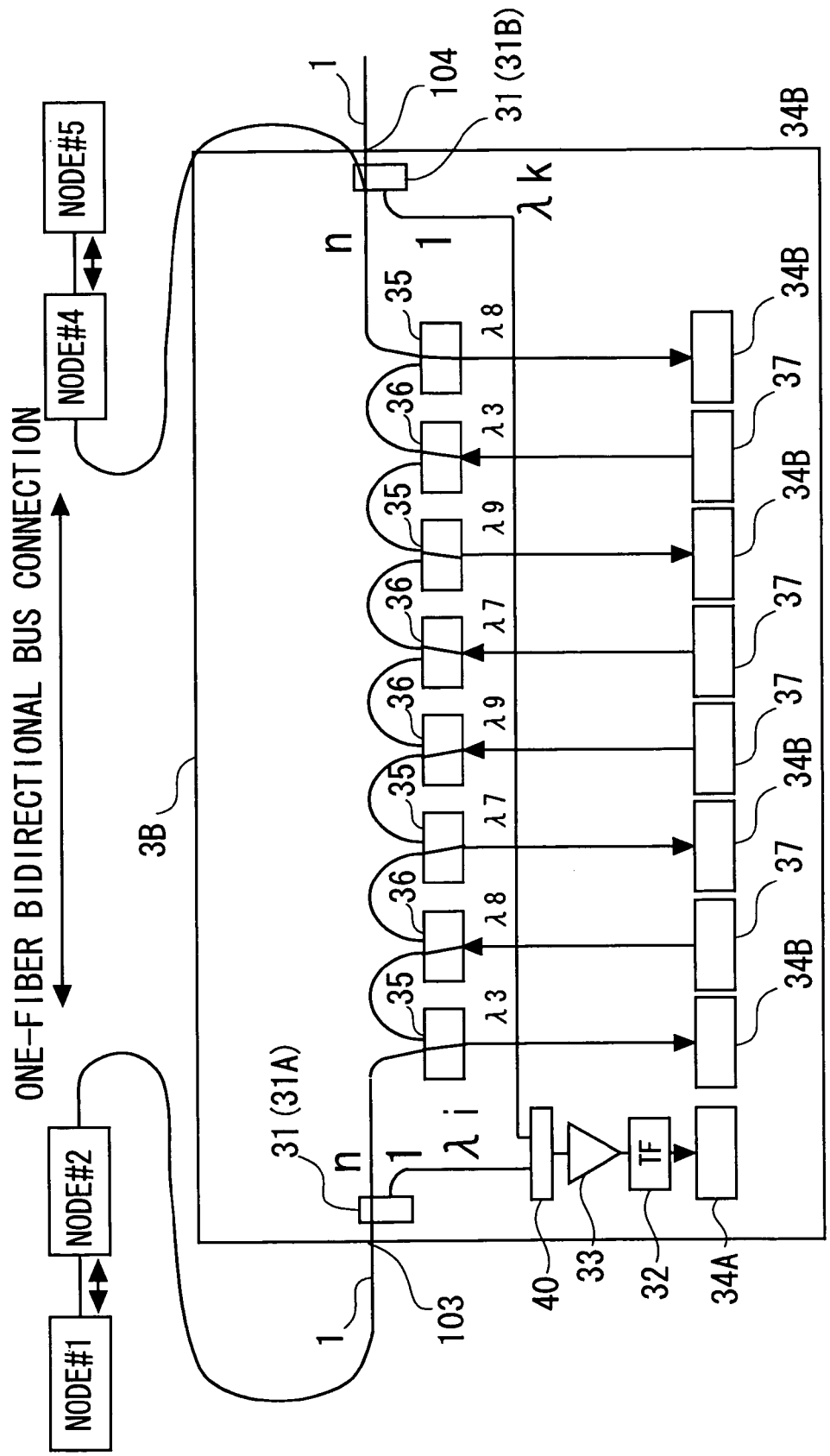
FIG. 13 is a view showing a configuration of a bus type optical network.

FIG. 13 illustrates a configuration of the optical network in the bus topology. This bus topology optical network is configured by connecting the nodes #1 through #5 on a line. FIG. 13 explicitly shows a construction of an optical add/drop multiplexer 3B. The following discussion proceeds in a way that exemplifies the node #3 in FIG. 13.

The optical add/drop multiplexer 3B includes, as compared with the optical add/drop multiplexer 3 in the first embodiment, two pieces of 1-to-n optical branching couplers 31. In the case of distinguishably naming the two pieces of 1-to-n optical branching couplers 31, the coupler connected to the fiber 1 positioned on the left side of the node #3 in FIG. 13 is named a 1-to-n optical branching coupler 31A. Further, the coupler connected to the fiber 1 positioned on the right side of the node #3 in FIG. 13 is named a 1-to-n optical branching coupler 31B (corresponding to a second optical branching unit according to the invention).

In the second embodiment, as shown in FIG. 13, the 1-to-n optical branching coupler 31A is connected to a connection end 103 of the fiber 1 on the left side of the node #3, while the 1-to-n optical branching coupler 31B is connected to a connection end 104 on the right side. In the wavelength division multiplexed light branched off at the 1-to-n optical branching couplers 31A, 31B, power on the order of (n−1)/n is outputted to n-sided waveguides and are wave-guided therein to a string of the plurality of fixed wavelength drop/add filters 35, 36.

On the other hand, in the wavelength division multiplexed light branched off at the 1-to-n optical branching couplers 31A, 31B, power on the order of 1/n is outputted respectively to the 1-sides and inputted to a multiplexing optical coupler 40 (corresponding to an optical multiplexing unit according to the invention). The multiplexing optical coupler 40 multiplexes the signal coming from the left side and the signal coming from right side of the node #3 in FIG. 13, and inputs the multiplexed signal to the wavelength tunable filter 32.

The wavelength tunable filter 32, as in the case of the first embodiment, demultiplexes the optical signal having a designated wavelength by a predetermined wavelength selection signal, and introduces the demultiplexed signal into the light receiving unit 34A. Further, the fixed wavelength drop filter 35 also, as in the case of the first embodiment, demultiplexes the optical signal having a predetermined fixed wavelength and introduces the demultiplexed signal into the light receiving unit 34B. Moreover, the fixed wavelength add filter 36 also, as in the case of the first embodiment, adds the optical signal having a fixed wavelength from the light emitting unit 37 to the wavelength division multiplexed light, and sends the added signal to the transmission path.

Given herein is an explanation of an arrangement sequence of the fixed wavelength drop filters 35 and the fixed wavelength add filters 36. In the example in FIG. 13, the nodes #1, #2 are disposed on the left side of the node #3, while the nodes #4, #5 are disposed on the right side thereof. Therefore, the optical add/drop multiplexer 3B of the node #3 has the fixed wavelength drop and add filters provided respectively by twos for the transmission and receipt to and from the left-sided fiber 1 in close proximity to the connection end of the left-sided fiber 1. Further, the optical add/drop multiplexer 3B has the fixed wavelength drop and add filters provided respectively by twos for the transmission and receipt to and from the right-sided fiber 1 in close proximity to the connection end of the right-sided fiber 1.

Namely, the node #3 in FIG. 13 is equipped with the filters for dropping the wavelengths λ3, λ7, λ8, λ9 corresponding to the nodes #1, #2, #4, #5, and with the filters adding the wavelengths λ8, λ9, λ7, λ3 corresponding to these nodes. Thus, in the example in FIG. 13, the same wavelengths are dropped and added, however, optical flow directions are different with respect to the node #3, and hence it does not happen that the optical signals having the same wavelength do not flow through the same fiber 1. That is to say, one of the two optical signals having the same wavelength travels through the lift-sided fiber 1 of the node #3, while the other optical signal travels through the right-sided fiber 1. For example, the wavelength of the optical signal transmitted from the node #1 and received by the node #3 is λ3, however, the wavelength of the optical signal transmitted from the node #3 to the node #1 is λ8, wherein the same wavelength is not employed on the same transmission path. The fixed wavelength drop and add filters are arranged so that the flowing wavelengths are not overlapped by setting similarly the receipt wavelength at λ7 and the transmission wavelength at λ9 with respect to the node #2, the receipt wavelength at λ9 and the transmission wavelength at λ7 with respect to the node #4, and the receipt wavelength at λ8 and the transmission wavelength at λ3 with respect to the node #5. FIG. 14 shows how the wavelengths given above are allocated.

Further, also in the case of the second embodiment, respectively on the left-sided transmission path and the right-sided transmission path of the node #3, the arrangement sequence of the fixed wavelength drop filters 35 is that the filters 35 are arranged, as viewed from the self-node, in the receipt wavelength selection sequence from the remotest node in the network topology in close proximity to the connection ends 103, 104 in the respective directions of the fiber 1.

To be specific, the fixed wavelength drop filter 35 that demultiplexes the wavelength λ3 received from the node #1 is disposed closer to the left-sided connection end 103 than the fixed wavelength drop filter 35 that demultiplexes the wavelength λ7 received from the node #2. Further, the fixed wavelength drop filter 35 that demultiplexes the wavelength λ8 received from the node #5 is disposed closer to the right-sided connection end 104 than the fixed wavelength drop filter 35 that demultiplexes the wavelength λ9 received from the node #4.

Moreover, as for the arrangement sequence of the fixed wavelength add filters 36, the filters 36 are arranged, as viewed likewise from the self-node, in the transmission wavelength add sequence to the remotest node in the network topology in close proximity to the connection ends 103, 104 in the respective directions thereof.

Specifically, the fixed wavelength add filter 36 that adds the wavelength λ8 to be transmitted to the node #1 is disposed closer to the left-sided connection end 103 than the fixed wavelength add filter 36 that adds the wavelength λ9 to be transmitted to the node #2. Further, the fixed wavelength add filter 36 that adds the wavelength λ3 to be transmitted to the node #5 is disposed closer to the right-sided connection end 104 than the fixed wavelength add filter 36 that adds the wavelength λ7 to be transmitted to the node #4.

Incidentally, in the case of the node #1, the fiber 1 is connected to only the right side of the optical add/drop multiplexer (unillustrated), wherein only the communications with the right-sided transmission path are allowed. Therefore, the optical add/drop multiplexer of the node #1 has the fixed wavelength drop and add filters provided by fours for the transmission to and the receipt from the right side.

In this case also, the arrangement sequence of the fixed wavelength drop filters 35 is that the filters 35 are arranged, as viewed from the self-node, in the receipt wavelength selection sequence from the remotest node in the network topology in close proximity to the connection end of the fiber 1. Further, the arrangement sequence of the fixed wavelength add filters 36 is that the filters 36 are arranged, as viewed from the self-node, in the transmission wavelength add sequence to the remotest node in the network topology in close proximity to the connection end thereof.

This arrangement is the same also with the node #5 to which the fiber 1 is connected on its left side. The optical add/drop multiplexer (unillustrated) of the node #5 has the fixed wavelength drop and add filters provided by fours for the transmission to and the receipt from the left side.

Similarly, in the case of the node #2, the optical add/drop multiplexer (unillustrated) of the node #2 is equipped with the single fixed wavelength drop filter 35 and the single fixed wavelength add filter 36 for the transmission to and the receipt from the left-sided fiber 1 in close proximity to the connection end of the left-sided fiber. Further, the optical add/drop multiplexer is equipped with the fixed wavelength drop filters 35 and the single fixed wavelength add filters 36 by threes for the transmission to and the receipt from the right-sided fiber 1 in close proximity to the connection end of the right-sided fiber 1. This arrangement is the same also with the node #4 except such a point that the arrangements are replaced in terms of the number of filters in bilateral symmetry.

Next, a method for actualizing the multicast will be described with reference to FIG. 13. As viewed from the node #3, a topologically remotest node on the left-sided transmission path is #1, and the remotest node on the right-sided transmission path is #5. In the case of FIG. 13, the multicasting is performed with the different wavelengths on the right side and the left side, respectively. The node #3 multicasts to the left side by use of the wavelength λ8 to be transmitted to the node #1, and multicasts to the right side by use of the wavelength λ3 to be transmitted to the node #5. This sort of wavelength allocation enables a further reduction of the coherent cross-talk.

Generally, the optical signal traveling through the left-sided transmission path of the node #3 and the optical signal traveling through the right-sided transmission path thereof are out of phase. For instance, an assumption is that the fluxes of light having the same wavelength are outputted from the node #3 to the right and left transmission paths simultaneously. In this case, of the optical signals on the left-sided transmission path, some signals leaking out to the right-sided transmission path, though slight of power attenuated by about 40 dB, might become noises unallowable to the optical signals having the same wavelength with a phase shift on the right-sided transmission path. Accordingly, such noises caused by the coherent cross-talk can be further reduced by differentiating the wavelengths to be transmitted by multicasting through on the left and right transmission paths in the bus topology network.

In the second embodiment, however, the wavelength λ8 used for the multicast distribution through on the left-sided transmission path of the node #3 is used as a receipt wavelength from the node #5 on the right-sided transmission path. Moreover, the wavelength λ3 used for the multicast distribution through on the right-sided transmission path of the node #3 is used as a receipt wavelength from the node #1 on the left-sided transmission path. Thus, in the second embodiment, the same wavelength is employed respectively on the fibers 1 on the right and left sides of the node #3, thereby making it possible to decrease the number of wavelengths to be used.

At this time, each of the nodes other than the node #3 adjusts the tunable filter 32 for receiving the wavelength λ8 (the node on the transmission path on the left side of the node #3) transmitted from the node #3 or the wavelength λ3 (the node on the transmission path on the right side of the node #3), and thus receives the wavelength from the node #3. The procedure given above is the same as the procedure (see FIG. 11) in the first embodiment except transmitting the optical signals to the right- and left-sided fibers 1 in an intermediate node such as the node #3, etc.

It should be noted that if the coherent cross-talk is at a sufficiently ignorable level, the wavelengths for the multicast distribution may be made coincident on the transmission paths on the right and left sides of the node #3. Namely, the same wavelength as the wavelength of the optical signal to be transmitted to the node #1 on the left-sided transmission path of the node #3 may be employed as the wavelength of the optical signal to be transmitted to the node #5 on the right-sided transmission path. Even when set in this way, the same wavelength is used respectively on the fibers 1 on the right and left sides of the node #3, and hence it is possible to decrease the number of wavelengths for use as in the case of the wavelength allocation in FIG. 14.

While on the other hand, the node #1 sends all the optical signals to the right-sided fiber 1 and is therefore required to differentiate the transmission wavelength from the receipt wavelength with respect to the communication partner nodes #2 through #5, wherein the wavelength can not be reused. Referring to the wavelength allocation in FIG. 14, the wavelengths of the optical signals transmitted from the node #1 to the nodes #2 through #5 are λ4, λ3, λ2, λ1, respectively, while the wavelengths of the optical signals received by the node #1 from the nodes #2 through #5 are λ5, λ8, λ11, λ12, with the result that all the wavelengths are different. This point is the same with the node #5.

Further, in the node #2, only the node #1 is connected onto the left-sided fiber 1, and the other nodes #3 through #5 are connected to the right-sided fiber 1. Therefore, the two wavelengths used for the transmission to and the receipt from the node #1 can be utilized for transmitting to and receiving from the node (any one of #3 through #5) on the right-sided fiber 1. Referring to the wavelength allocation in FIG. 14, the wavelength of the optical signal to be transmitted to the node #1 from the node #2 is λ5, and the wavelength of the optical signal to be received by the node #2 from the node #1 is λ4. On the other hand, the wavelengths to be transmitted to the nodes #3 through #5 from the node #2 are λ7, λ6, λ4, and the receipt wavelength λ4 from the node #1 is used as a transmission wavelength to the node #5. Moreover, the wavelengths transmitted from the nodes #3 through #5 and received by the node #2 are λ9, λ10, λ5, and the transmission wavelength λ5 to the node #1 is used as a receipt wavelength from the node #5. This sort of wavelength allocation is the same with the node #4.

As described above, in the connection taking the bus topology, each node can use, for the communication on the right-sided fiber 1, the optical signal having the same wavelength as the wavelength used for the communication on the fiber 1 connected to the left side of the self-node. Then, any node can use, as the wavelength for the multicast distribution, the optical signal having the wavelength λm used for the transmission to the node existing in the topologically remotest position in the nodes connected to the respective right- and left-directional fibers 1.

Figure 15:
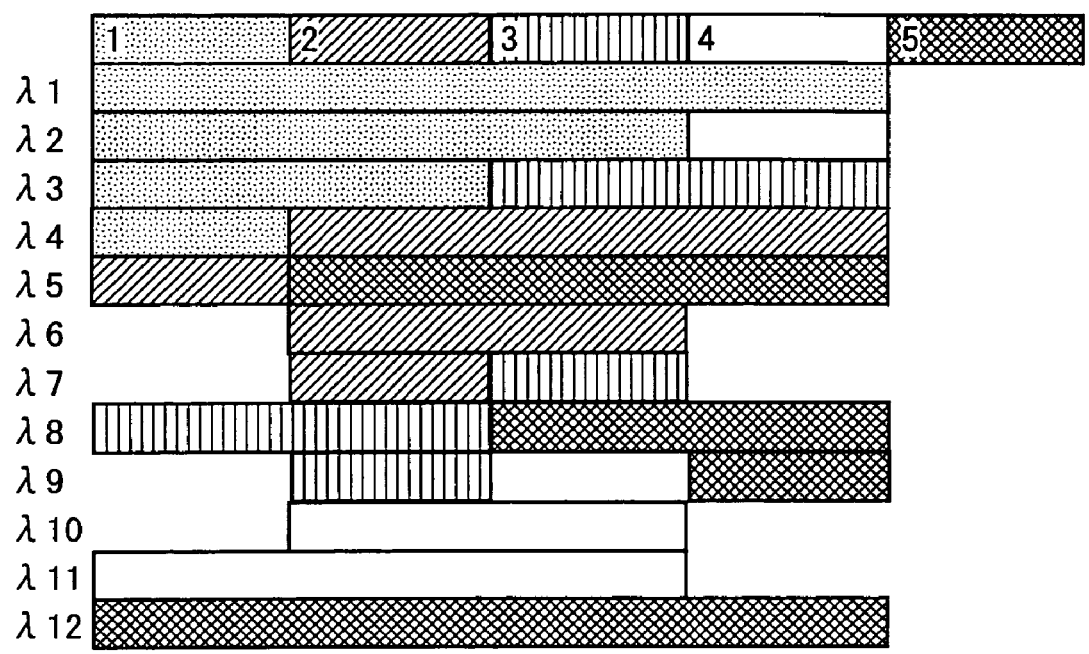
FIG. 15 is a diagram showing wavelength allocation (2) in the optical network in FIG. 13.

FIG. 15 illustrates the wavelengths existing between the respective nodes on the fiber 1. For example, the wavelength λ1, which is transmitted from the node #1, passes through the individual nodes up to the node #5 and therefore exists throughout the entire sections. This is the same with a wavelength λ12.

Moreover, the wavelength λ2 is used in a section between the node #1 and the node #4 and in a section between the node #4 and the node #5. The wavelength λ3 is used in a section between the node #1 and the node #3 and in a section between the node #3 and the node #5. On the other hand, for instance, the wavelength λ6 is to be employed only in a section between the node #2 and the node #4.

As described above, according to the optical network, the wavelength can be used in duplex on each of the right- and left-sided fibers 1 of each node, and the number of types of the wavelengths for use throughout the whole network can be reduced. For example, in the network in FIG. 13, the use of the individually different wavelengths for transmitting to and receiving from the respective nodes requires 20 types of wavelengths, however, these types of wavelengths can be decreased down to 12 types according to the system in the second embodiment.

Further, according to the optical network, on the individually right- and left-sided fibers of each node, the optical signal of the wavelength used for the transmission to the topologically remotest node can be employed for the multicast distribution. As a result, in the nodes other than the nodes #1 and #5 connected to both side ends of the fiber 1, the two ports are used for the multicast distribution, however, other ports can be ensured for the communications with other nodes. Moreover, in the nodes #1 and #5 connected to the side ends of the fiber 1, one single port is employed for the multicast distribution.

Furthermore, in the optical add/drop multiplexer 3B in the second embodiment, the point that the WDM amplifier for amplifying the optical signal which is in series to the transmission path can be reduced, is the same as the case of the first embodiment. Moreover, the point that there is no necessity of amplifying the output signal from the fixed wavelength drop filter 35 is also the same as the case of the first embodiment.

Still further, also in the optical add/drop multiplexer 3B in the second embodiment, when receiving the multicast signals from the plurality of nodes, this can be attained by using 1×n optical coupler as shown in FIG. 12, and arranging k-pieces (k<N) of tunable filters.

As described above, according to the optical add/drop multiplexer 3B in the second embodiment, the full-mesh-configured network taking the one-core bidirectional bus topology is built up, wherein the multicast distributions can be conducted in the right and left connecting directions. Note that the second embodiment has exemplified the line-shaped fiber 1 as shown in FIG. 13 by way of the example of the bus topology optical network. The embodiment of the invention is not, however, limited to this line-shaped network, and the fiber may be branched off midway.

It is to be noted that if the number of branches becomes multiple, the wavelength division multiplexed light is required to be amplified by the ADM amplifier as the necessity arises, however, the WDM amplifier is used limitedly in a portion containing a large number of branches in this case. Accordingly, the system of the second embodiment is still more advantageous in terms of its being capable of saving the number of WDM amplifiers than in the network requiring the WDM amplifier for every node for relaying the optical signal that is in series to the transmission path.

Further, also in the network including the branches provided midway, the procedure of the multicast distribution is the same, wherein the optical signal having the wavelength λm to be transmitted to the topologically remotest node #M from the node #K may be used for the multicasting. In this case, a node existing on a route P2 branching off from a route P1 to the topologically remotest node #M, may also be provided with the optical tunable filter 32 for selecting the optical signal having the wavelength λm as the node existing midway on the route P1 to the topologically remotest node #M is provided with.

Moreover, in the second embodiment, the 1-to-n optical branching couplers 31A and 31B are disposed in the vicinities of the connection ends 103, 104 to the fibers 1. The embodiment of the invention is not, however, limited to this configuration. For instance, the 1-to-n optical branching couplers 31A and 31B may be inserted in some positions in the alignment of the fixed wavelength drop filters 35 and the fixed wavelength add filters 36. In short, it may be sufficient to branch the optical signal exhibiting the power ratio of n/(n−1) to the route in series to the transmission path and to branch the optical signal exhibiting the power ratio of 1/n to the other route.

Third Embodiment

A third embodiment of the invention will be described with reference to FIGS. 16 through 18. The first embodiment has exemplified how the optical ring network is configured, in which the optical add/drop multiplexers 3 including the fixed wavelength drop filters 35 and the fixed wavelength add filters 36 serve as the nodes.

By the way, in the case of altering the network in a way that adds or removes the nodes, it is required that the fixed wavelength drop filters 35 and the fixed wavelength add filters 36 be added to all the nodes (the removal is not necessarily required). In this case, maintainability is improved by taking a unit form (which is also called a module form), wherein the respective filters 35, 36 are set paired. Such being the case, the third embodiment will exemplify an example of constructing the optical add/drop multiplexer 3 by using the paired units of the fixed wavelength drop filters 35 and the fixed wavelength add filters 36. Other configurations and operations are the same as those in the first embodiment. Then, the same components as those in the first embodiment are marked with the same numerals, and their explanations are omitted. Further, the drawings in FIGS. 1 through 12 will be referred to according to the necessity.

Figure 16:
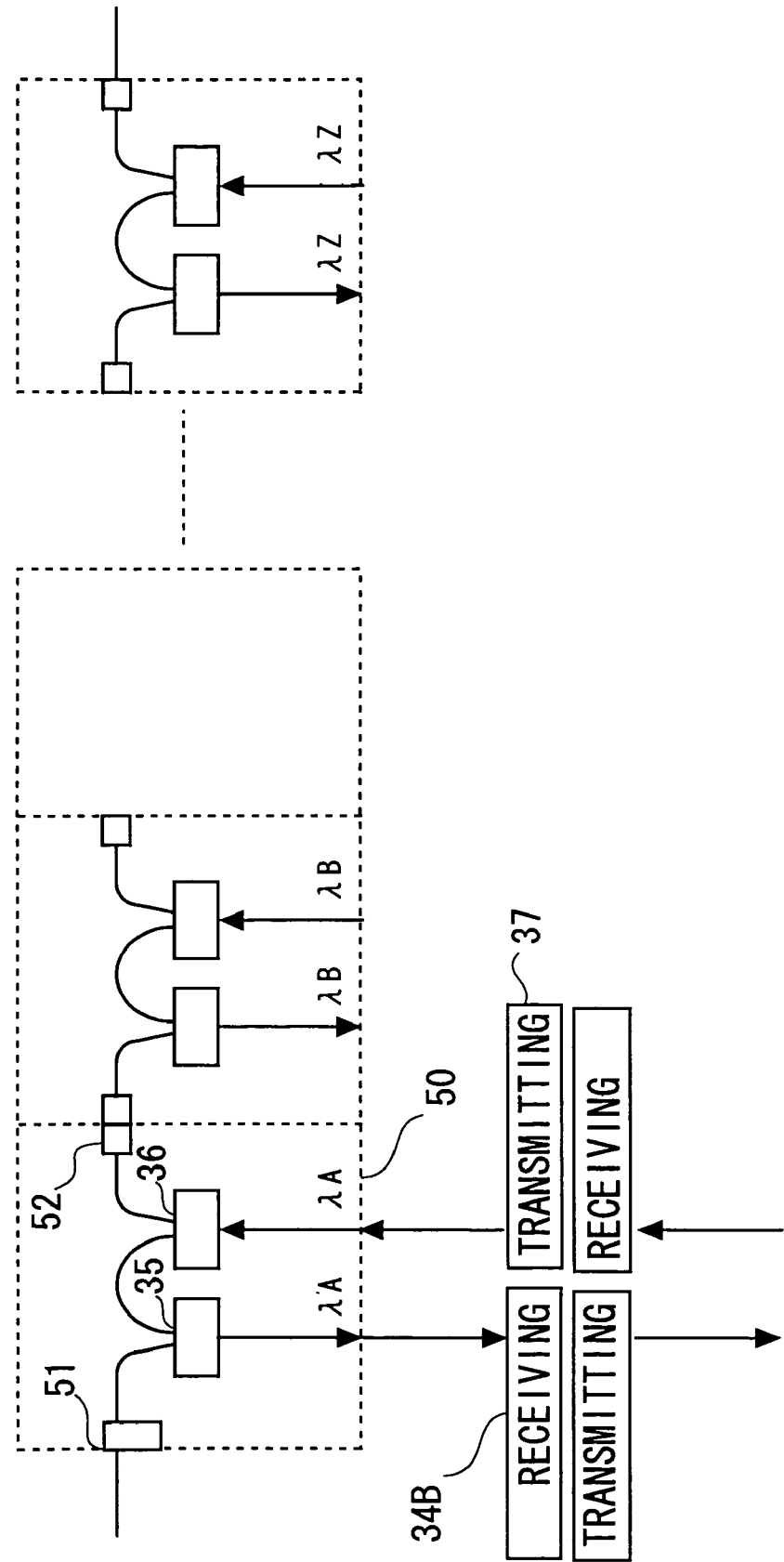
FIG. 16 is a diagram showing an image of a unit constructed by pairing a fixed wavelength drop filter with a fixed wavelength add filter.

FIG. 16 shows an image of a unit 50 (corresponding to a fixed wavelength add/drop module according to the invention) in which the fixed wavelength drop filter 35 for demultiplexing a wavelength λA and the fixed wavelength add filter 36 for adding the wavelength λA are paired. This unit 50 includes the pair of fixed wavelength drop filter 35 and fixed wavelength add filter 36. An optical waveguide is formed extending from a common output port of the fixed wavelength drop filter 35 to a common input port of the fixed wavelength add filter 36.

Further, an optical waveguide is formed extending from the common input port of the fixed wavelength drop filter 35 to an ingress portion 51 of the unit 50. Moreover, an optical waveguide is formed extending from the common output port of the fixed wavelength add filter 36 to an egress portion 52 of the unit 50. With this configuration, the unit 50 functions as a port that drops and adds the fixed wavelength λA.

The ingress portion 51 and the egress portion 52 of the unit 50 have optical adapters connectable by the optical fiber, whereby the ingress portion 51 and the egress port are connectable to each other via the optical fiber. Accordingly, as shown in FIGS. 16 and 17, the fixed wavelength drop filters 35 and the fixed wavelength add filters 36 within the plurality of units 50 can be connected in series by connecting respectively the ingress portions 51 and the egress portions 52 of the plurality of units 50 with the optical fiber. Further, a desired unit can be removed from the plurality of units 50 connected in series.

Note that a connection between the fixed wavelength drop filter 35 and the light receiving unit 34B is established through a waveguide and an optical adapter. Moreover, a connection between the fixed wavelength add filter 36 and the light emitting unit 37 is established through the waveguide and the optical adapter. Constructions of the waveguide and the optical adapter are the same as those of the optical waveguide extending from the common input port of the fixed wavelength drop filter 35 to the ingress portion 51 of the unit 50 and the optical adapter of the ingress portion 51, and hence their explanations are omitted.

Figure 17:
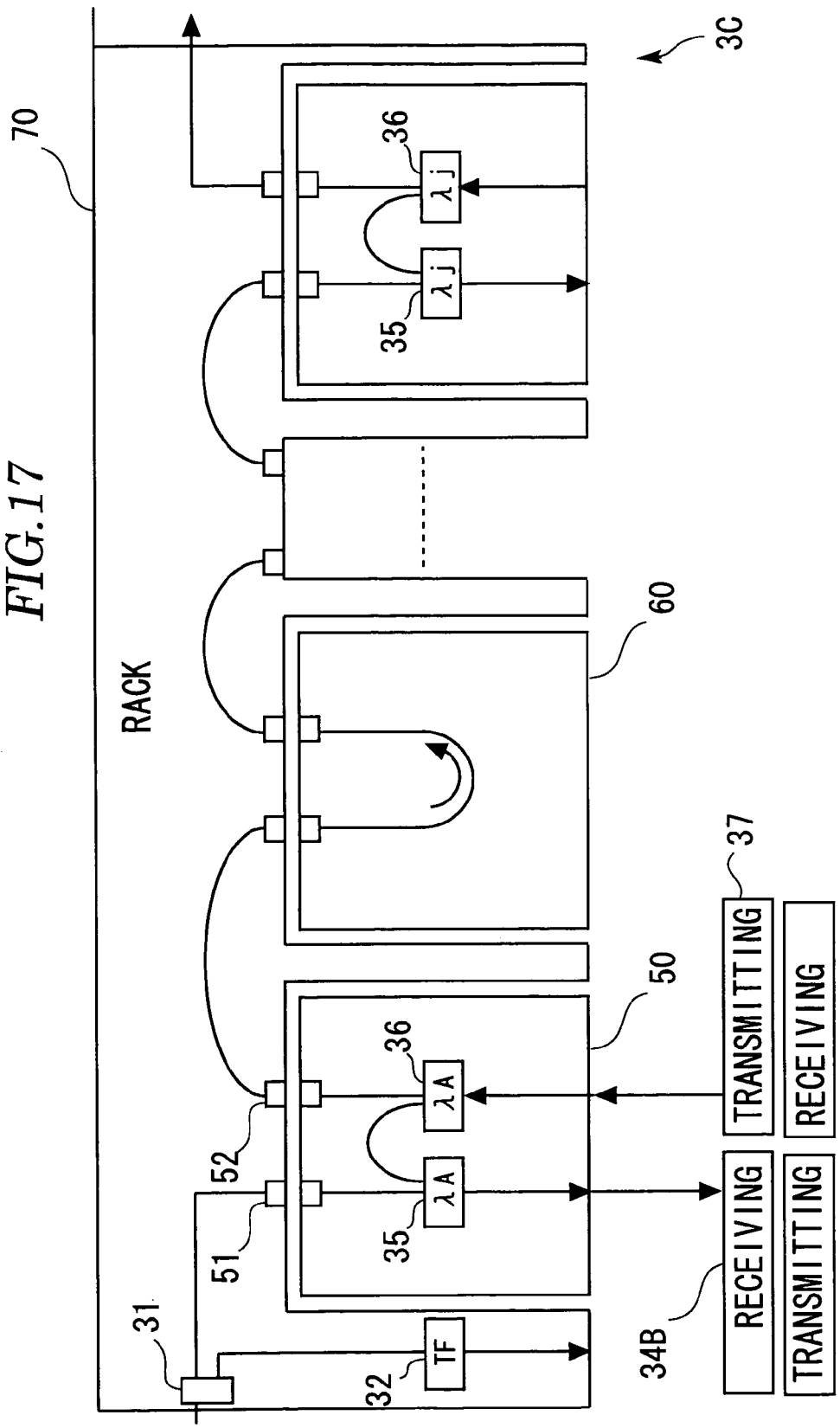
FIG. 17 is a diagram showing how the units constructed by pairing the pairing fixed wavelength drop filters with the fixed wavelength add filters, are connected.

FIG. 17 shows an example of constructing an optical add/drop multiplexer 3C by combining the units 50. This optical add/drop multiplexer 3C includes a rack 70, and the rack 70 is provided with the 1-to-n optical branching coupler 31, the optical tunable filter 32 and the plurality of units 50. Further, in the example in FIG. 17, a through-unit 60 is exemplified. The through-unit 60 is a unit that has only a waveguide inside, through which the optical signal from the ingress portion 51 is outputted directly to the egress 52. On the other hand, by contrast with the through-unit 60, the unit 50 including the fixed wavelength drop filter 35 and the fixed wavelength add filter 36 is particularly called a fixed wavelength add/drop filter.

Figure 18:
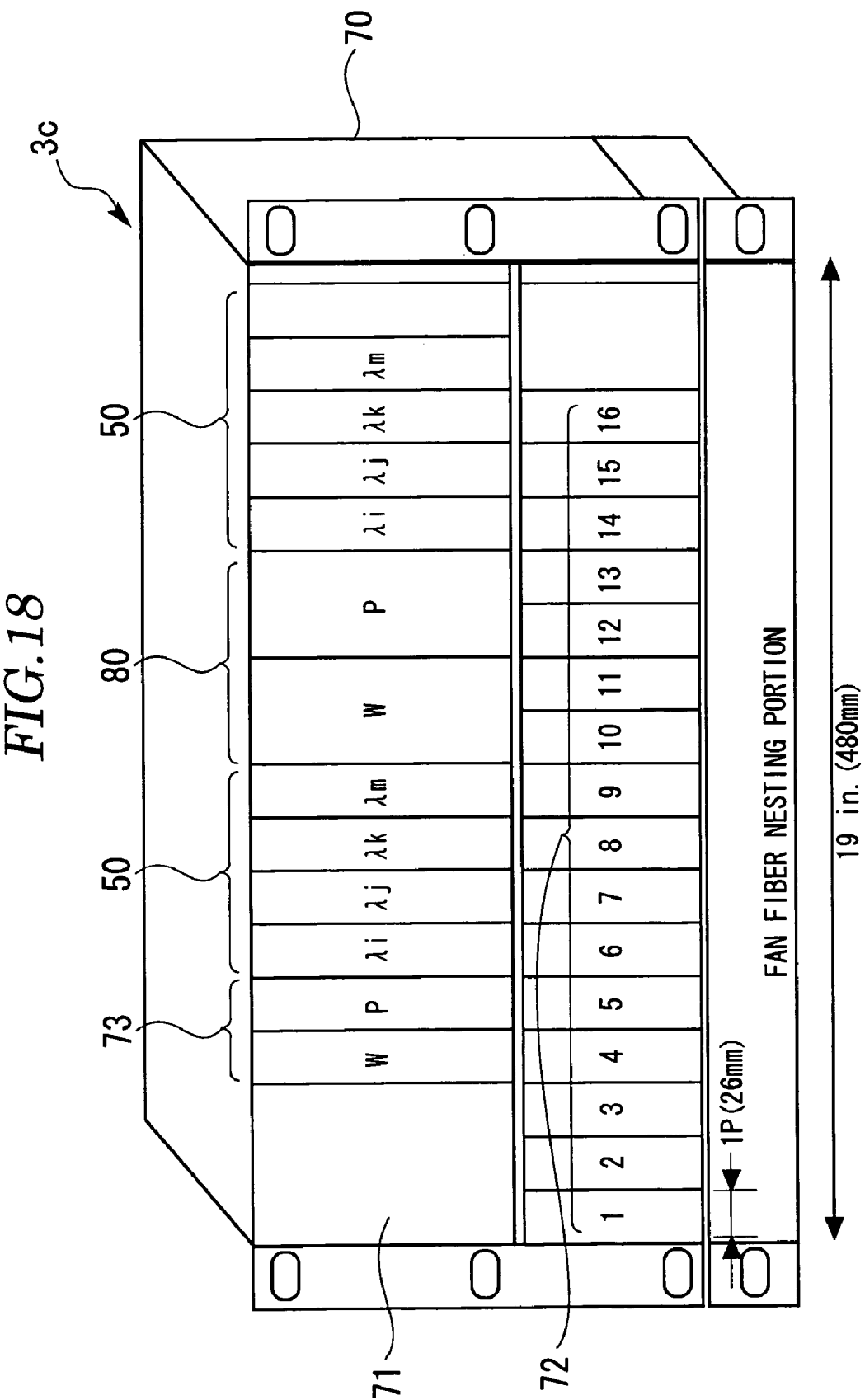
FIG. 18 is a view showing an external configuration of a rack mounted with the units constructed by pairing the pairing fixed wavelength drop filters with the fixed wavelength add filters.

FIG. 18 is a view of an external configuration of the optical add/drop multiplexer 3 in the third embodiment. In the example in FIG. 18, an interior of the rack 70 is mounted with a control unit 71, a transponder unit 72, an OSC (Optical Superviser Channel) unit 73, a plurality of fixed wavelength add/drop units 50 and a unit 80 including the optical tunable filter 32. These respective units, as the ingress portions 51 and the egress portions 52 are connected through the optical fiber stored in a fiber nesting portion, logically constitute the optical add/drop multiplexer 3C shown in FIG. 17.

The control unit is mounted with a CPU, etc. for controlling the optical add/drop multiplexer 3C. The transponder unit is mounted with the light receiving units 34A, 34B and the light emitting unit 37, etc. . . . The OSC unit 73 has ports for receiving and transmitting the monitor control light.

The control unit 71 is mounted with a control circuit for the optical add/drop multiplexer 3C constituting each node to perform the autonomous distributed control of the network. Further, the transponder unit 72 and the OSC unit 73 themselves are not related directly to carrying out the invention, and therefore explanations thereof are omitted.

As illustrated in FIGS. 16 and 17, the unit 50 insertable into and removable from the rack 70 functions as the fixed wavelength add/drop filter unit having a pair of wavelength λA to be demultiplexed and wavelength λA to be added. With this type of units 50, the network can be flexibly configured and altered. If there is no necessity of the fixed wavelength add/drop filter function, it is possible to make preparation for an extension in the future by inserting the through unit.

The third embodiment has given the explanation about the unit 50 providing the fixed wavelength add/drop filter function in the optical ring network. In this case, the unit 50 drops and adds the optical signal having the same wavelength λA. As a substitute for this, the fixed wavelength add/drop filter unit usable in the bus topology optical network can be constructed by combining the fixed wavelength drop filter 35 that demultiplexes the wavelength λA with the fixed wavelength add filter 36 that adds the wavelength λB.

What is claimed is:

1. An optical add drop apparatus comprising:
a plurality of fixed wavelength drop filters connected in series to a transmission path and each demultiplexing an optical signal having a fixed wavelength from wavelength division multiplexed light flowing along the transmission path;
a plurality of fixed wavelength add filters connected in series to the transmission path and to the fixed wavelength drop filters, and each adding an optical signal having a fixed wavelength to be transmitted to a transmission source of each of the demultiplexed optical signals to the wavelength division multiplexed light flowing along the transmission path;
a first optical branching unit connected in series to the transmission path and to the fixed wavelength drop filter and the fixed wavelength add filters, and branching part of the wavelength division multiplexed light flowing along the transmission path;
a variable wavelength drop filter demultiplexing an optical signal having a wavelength corresponding to a specified value from the wavelength division multiplexed light branched by the first optical branching unit;
a second optical branching unit connected in series to the transmission path, the fixed wavelength drop filters, the fixed wavelength add filters and the first optical branching unit, and branching a part of the wavelength division multiplexed light flowing along the transmission path in a direction different from the wavelength division multiplexed light branched by the first branching unit; and an optical multiplexing unit multiplexing the wavelength division multiplexed light branched by the first optical branching unit and by the second optical branching unit, wherein the variable wavelength drop filter demultiplexes an optical signal having a wavelength corresponding to a second specified value from the wavelength division multiplexed light multiplexed by the optical multiplexing unit.

2. An optical add drop apparatus according to claim 1, wherein a fixed wavelength add drop module is formed by pairing one of the fixed wavelength drop filters and the fixed wavelength add filter adding the optical signal to be transmitted to the transmission source of the optical signal demultiplexed by the fixed wavelength drop filter.

3. An optical add drop apparatus according to claim 1, wherein a drop filter string is formed by connecting the plurality of fixed wavelength drop filters in series, and an add filter string is formed by connecting the plurality of fixed wavelength add filters in series.

4. An optical add drop apparatus according to claim 1, the variable wavelength drop filter including:
an optical amplifier amplifying the wavelength division multiplexed light;
a third optical branching unit branching the wavelength division multiplexed light amplified by the optical amplifier into plural fluxes of multiplexed light; and
a plurality of variable wavelength drop filter units demultiplexing the optical signals having the wavelengths each corresponding to a specified value from the respective fluxes of wavelength division multiplexed light branched by the third optical branching unit.

5. An optical add drop apparatus according to claim 1, wherein the fixed wavelength drop filters and the fixed wavelength add filters have 3-port configured filters that use dielectric multi-layered films.

6. An optical network comprising a plurality of optical add drop apparatuses connected to a transmission path, each optical add drop apparatus comprising:
a plurality of fixed wavelength drop filters connected in series to the transmission path and each demultiplexing an optical signal having a fixed wavelength from wavelength division multiplexed light flowing along the transmission path;
a plurality of fixed wavelength add filters connected in series to the transmission path and to the fixed wavelength drop filters, and each adding an optical signal having a fixed wavelength to be transmitted to a transmission source of each of the demultiplexed optical signals to the wavelength division multiplexed light flowing along the transmission path;
a first optical branching unit connected in series to the transmission path and to the fixed wavelength drop filters and the fixed wavelength add filters, and branching part of the wavelength division multiplexed light flowing along the transmission path; and
a variable wavelength drop filter demultiplexing an optical signal having a wavelength corresponding to a specified value from the wavelength division multiplexed light branched by the first optical branching unit,
wherein the variable wavelenath drop filter of the optical add drop apparatus includes an optical amplifier amplifying the wavelength division multiplexed light, a second optical branching unit branching the wavelength division multiplexed light amplified by the optical amplifier into fluxes of the multiplexed light, and a plurality of variable wavelenath drop filter units demultiplexing the optical signals having wavelengths each corresponding to a specified value from the fluxes of wavelength division multiplexed light branched by the second optical branching unit.

7. An optical network according to claim 6, wherein the optical network is a ring network in which the optical signals are transmitted in one direction, and each of the optical add drop apparatuses is connected to the transmission path of which one end serves as a light receiving end and the other end serves as a light transmitting end, the fixed wavelength drop filters of each optical add drop apparatus are provided corresponding to the number of communication partner optical add drop apparatuses from which the optical add drop apparatus receives the optical signals, and receive the optical signals respectively from the communication partner optical add drop apparatuses by demultiplexing the optical signals respectively having different wavelengths from the transmission path, the fixed wavelength add filters of each optical add drop apparatus are provided corresponding to the number of communication partner optical add drop apparatuses to which the optical add drop apparatus transmits the optical signals, and transmit the optical signals respectively to the communication partner optical add drop apparatuses by adding to the transmission path the optical signals corresponding to the wavelengths of the optical signals that are demultiplexed by the respective fixed wavelength drop filters, the variable wavelength drop filter of each optical add drop apparatus demultiplexes the optical signal having the wavelength in the process of being transmitted and received between any two optical add drop apparatuses among the other optical add drop apparatuses by the fixed wavelength add filter and the fixed wavelength drop filter of these two optical add drop apparatuses, which wavelength is different from any one of the wavelengths of the optical signals in the process of being received by the fixed wavelength drop filters of the optical add drop apparatus, in the optical signals added from the fixed wavelength add filters of a first optical add drop apparatus on the optical network, the optical signal having the wavelength that is demultiplexed by the fixed wavelength drop filter of a second optical add drop apparatus connected in the remotest position from the first optical add drop apparatus on a topology of the optical network, is also a transmission signal to other plural optical add drop apparatuses different from the second optical add drop apparatus on the optical network, and the other plural optical add drop apparatuses select the transmission signal through their variable wavelength drop filters.

8. An optical network according to claim 6, wherein the optical network is a ring network in which the optical signals are transmitted in one direction, and each of the optical add drop apparatuses is connected to the transmission path of which one end serves as a light receiving end and the other end serves as a light transmitting end, the fixed wavelength drop filters of each optical add drop apparatus are provided corresponding to the number of communication partner optical add drop apparatuses from which the optical add drop apparatus receives the optical signals, and receive the optical signals respectively from the communication partner optical add drop apparatuses by demultiplexing the optical signals respectively having different wavelengths from the transmission path, the fixed wavelength add filters of each optical add drop apparatus are provided corresponding to the number of communication partner optical add drop apparatuses to which the optical add drop apparatus transmits the optical signals, and transmit the optical signals respectively to the communication partner optical add drop apparatuses by adding to the transmission path the optical signals corresponding to the wavelengths of the optical signals that are demultiplexed by the respective fixed wavelength drop filters, the variable wavelength drop filter of each optical add drop apparatus demultiplexes the optical signal having the wavelength in the process of being transmitted and received between any two optical add drop apparatuses among the other optical add drop apparatuses by the fixed wavelength add filter and the fixed wavelength drop filter of these two optical add drop apparatuses, which wavelength is different from any one of the wavelengths of the optical signals in the process of being received by the fixed wavelength drop filters of the optical add drop apparatus, in the plurality of fixed wavelength drop filters of each optical add drop apparatus, the fixed wavelength drop filter demultiplexing the optical signal having a wavelength from a remote communication partner optical add drop apparatus in an arrangement sequence from the optical add drop apparatuses in the topology of the optical network, is disposed in a position closer to the light receiving end in the series than the fixed wavelength drop filter demultiplexing the optical signal having a wavelength from a close communication partner optical add drop apparatus in the arrangement sequence, and the fixed wavelength drop filter demultiplexing the optical signal having a wavelength from a close communication partner optical add drop apparatus in the arrangement sequence, is disposed in a position remoter from the light receiving end in the series than the fixed wavelength drop filter demultiplexing the optical signal having a wavelength from a remote communication partner optical add drop apparatus in the arrangement sequence, and in the plurality of fixed wavelength add filters of each optical add drop apparatus, the fixed wavelength add filter adding the optical signal having a wavelength to a remote communication partner optical add drop apparatus in the arrangement sequence, is disposed in a position closer to the light transmitting end in the series than the fixed wavelength add filter adding the optical signal having a wavelength to a close communication partner optical add drop apparatus in the arrangement sequence, and the fixed wavelength add filter adding the optical signal having the wavelength to a close communication partner optical add drop apparatus in the arrangement sequence, is disposed in a position remoter from the light transmitting end in the series than the fixed wavelength add filter adding the optical signal having a wavelength to a remote communication partner optical add drop apparatus in the arrangement sequence.

9. An optical network according to claim 6, wherein the optical network is a ring network in which the optical signals are transmitted in one direction, and each of the optical add drop apparatuses is connected to the transmission path of which one end serves as a light receiving end and the other end serves as a light transmitting end, the fixed wavelength drop filters of each optical add drop apparatus are provided corresponding to the number of communication partner optical add drop apparatuses from which the optical add drop apparatus receives the optical signals, and receive the optical signals respectively from the communication partner optical add drop apparatuses by demultiplexing the optical signals respectively having different wavelengths from the transmission path, the fixed wavelength add filters of each optical add drop apparatus are provided corresponding to the number of communication partner optical add drop apparatuses to which the optical add drop apparatus transmits the optical signals, and transmit the optical signals respectively to the communication partner optical add drop apparatuses by adding to the transmission path the optical signals corresponding to the wavelengths of the optical signals that are demultiplexed by the respective fixed wavelength drop filters, the variable wavelength drop filter of each optical add drop apparatus demultiplexes the optical signal having the wavelength in the process of being transmitted and received between any two optical add drop apparatuses among the other optical add drop apparatuses by the fixed wavelength add filters and the fixed wavelength drop filters of these two optical add drop apparatuses, which wavelength is different from any one of the wavelengths of the optical signals in the process of being received by the fixed wavelength drop filters of the optical add drop apparatus, in the optical signals added from the fixed wavelength add filters of the first optical add drop apparatus on the optical network, the optical signal having the wavelength demultiplexed by the fixed wavelength drop filter of a second optical add drop apparatus connected in the remotest position from the first optical add drop apparatus in the topology of the optical network, is added as a transmission signal to other plural optical add drop apparatuses different from the second optical/add apparatus together to the second optical add drop apparatus on the optical network from the first optical add drop apparatus, and the other plural optical add drop apparatuses select the transmission signal through their variable wavelength drop filters, in the plurality of fixed wavelength drop filters of each optical add drop apparatus, the fixed wavelength drop filter demultiplexing the optical signal having a wavelength from a remote communication partner optical add drop apparatus in an arrangement sequence from the optical add drop apparatuses in the topology of the optical network, is disposed in a position closer to the light receiving end in the series than the fixed wavelength drop filter demultiplexing the optical signal having a wavelength from a close communication partner optical add drop apparatus in the arrangement sequence, and the fixed wavelength drop filter demultiplexing the optical signal having a wavelength from a close communication partner optical add drop apparatus in the arrangement sequence, is disposed in a position remoter from the light receiving end in the series than the fixed wavelength drop filter demultiplexing the optical signal having a wavelength from a remote communication partner optical add drop apparatus in the arrangement sequence, and in the plurality of fixed wavelength add filters of each optical add drop apparatus, the fixed wavelength add filter adding the optical signal having a wavelength to a remote communication partner optical add drop apparatus in the arrangement sequence, is disposed in a position closer to the light transmitting end in the series than the fixed wavelength add filter adding the optical signal having a wavelength to a close communication partner optical add drop apparatus in the arrangement sequence, and the fixed wavelength add filter adding the optical signal having a wavelength to a close communication partner optical add drop apparatus in the arrangement sequence, is disposed in a position remoter from the light transmitting end in the series than the fixed wavelength add filter adding the optical signal having a wavelength to a remote communication partner optical add drop apparatus in the arrangement sequence.

10. An optical network according to claim 7, wherein for each optical add drop apparatus, fixed wavelength drop filters are disposed in a position closer to the receiving end in the series than the fixed wavelength add filters, and the fixed wavelength add filters are disposed in a position closer to the transmitting end in the series than the fixed wavelength drop filters.

11. An optical network according to claim 6, wherein the optical network is a bus type network in which the optical signals are transmitted bidirectionally, and one end of the transmission path in a first direction of each optical add drop apparatus and the other end of the transmission path in a second direction opposite to the first direction, are connected, respectively serving as connection ends, to each optical add drop apparatus, the fixed wavelength drop filters of each optical add drop apparatus are provided corresponding to the number of communication partner optical add drop apparatuses from which the optical add drop apparatus receives the optical signals, and, respectively in the first direction and in the second direction, receive the optical signals from the communication partner optical add drop apparatuses by demultiplexing the optical signals having wavelengths each different for each of the communication partner optical add drop apparatuses from the transmission path, the fixed wavelength add filters of each optical add drop apparatus are provided corresponding to the number of communication partner optical add drop apparatuses to which the optical add drop apparatus transmits the optical signals, and, respectively in the first direction and in the second direction, transmit the optical signals to the communication partner optical add drop apparatuses by adding, to the transmission path, the optical signals having wavelengths each different for each of the communication partner optical add drop apparatuses, that are each different from any one of the wavelengths of the optical signals dropped by the fixed wavelength drop filters, the variable wavelength drop filter of each optical add drop apparatus demultiplexes the optical signals having the wavelengths in the process of being transmitted and received between any two optical add drop apparatuses among the other optical add drop apparatuses by the fixed wavelength add filter and the fixed wavelength drop filter of these two optical add drop apparatuses, which wavelengths are different from any one of the wavelengths of the optical signals in the process of being received by the fixed wavelength drop filters of the optical add drop apparatus, in the transmission path respectively in the first direction and in the second direction of a first optical add drop apparatus on the optical network, in the optical signals added from the fixed wavelength add filters of the first optical add drop apparatus, the optical signal having the wavelength dropped by the fixed wavelength drop filter of a second optical add drop apparatus connected in the remotest position from the first optical add drop apparatus in a topology of the optical network, is also a transmission signal to other plural optical add drop apparatuses different from the second optical add drop apparatus on the optical network, and the other plural optical add drop apparatuses select the transmission signal through their variable wavelength drop filters.

12. An optical network according to claim 6, wherein the optical network is a bus type network in which the optical signals are transmitted bidirectionally, and one end of the transmission path in a first direction of each optical add drop apparatus and the other end of the transmission path in a second direction opposite to the first direction, are connected, respectively serving as connection ends, to each optical add drop apparatus, the fixed wavelength drop filters of each optical add drop apparatus are provided corresponding to the number of communication partner optical add drop apparatuses from which the optical add drop apparatus receives the optical signals, and, respectively in the first direction and in the second direction, receive the optical signals from the communication partner optical add drop apparatuses by demultiplexing the optical signals having wavelengths each different for each of the communication partner optical add drop apparatuses from the transmission path, the fixed wavelength add filters of each optical add drop apparatus are provided corresponding to the number of communication partner optical add drop apparatuses to which the optical add drop apparatus transmits the optical signals, and, respectively in the first direction and in the second direction, transmit the optical signals to the communication partner optical add drop apparatuses by adding, to the transmission path respectively in the first direction and in the second direction, the optical signals having wavelengths different from any one of the wavelengths of the optical signals to be demultiplexed by the fixed wavelength drop filters and each different for each of the communication partner optical add drop apparatuses, in the plurality of fixed wavelength drop filters of each optical add drop apparatus, respectively in the first direction and in the second direction, the fixed wavelength drop filter demultiplexing the optical signal having a wavelength from a remote communication partner optical add drop apparatus in an arrangement sequence from the optical add drop apparatuses in the topology of the network, is disposed in a position closer to the connection end on the other side of the remote communication partner than the fixed wavelength drop filter demultiplexing the optical signal having a wavelength from a close communication partner optical add drop apparatus in the arrangement sequence, and the fixed wavelength drop filter demultiplexing the optical signal having a wavelength from a close communication partner optical add drop apparatus in the arrangement sequence, is disposed in a position remoter from the connection end on the other side of the close communication partner than the fixed wavelength drop filter demultiplexing the optical signal having a wavelength from a remote communication partner optical add drop apparatus in the arrangement sequence, and in the plurality of fixed wavelength add filters of each optical add drop apparatus, respectively in the first direction and in the second direction, the fixed wavelength add filter adding the optical signal having a wavelength to a remote communication partner optical add drop apparatus in the arrangement sequence, is disposed in a position closer to the connection end on the other side of the remote communication partner than the fixed wavelength add filter adding the optical signal having a wavelength to a close communication partner optical add drop apparatus in the arrangement sequence, and the fixed wavelength add filter adding the optical signal having the wavelength to a close communication partner optical add drop apparatus in the arrangement sequence, is disposed in a position remoter from the connecting end on the other side of the close communication partner than the fixed wavelength add filter adding the optical signal having a wavelength to a remote communication partner optical add drop apparatus in the arrangement sequence.

13. An optical network according to claim 6, wherein the optical network is a bus type network in which the optical signals are transmitted bidirectionally, and one end of the transmission path in a first direction of each optical add drop apparatus and the other end of the transmission path in a second direction opposite to the first direction, are connected, respectively serving as connection ends, to each optical add drop apparatus, the fixed wavelength drop filters of each optical add drop apparatus are provided corresponding to the number of communication partner optical add drop apparatuses from which the optical add drop apparatus receives the optical signals, and, respectively in the first direction and in the second direction, receive the optical signals from the communication partner optical add drop apparatuses by demultiplexing the optical signals having wavelengths each different for each of the communication partner optical add drop apparatuses from the transmission path, the fixed wavelength add filters of each optical add drop apparatus are provided corresponding to the number of communication partner optical add drop apparatuses to which the optical add drop apparatus transmits the optical signals, and, respectively in the first direction and in the second direction, transmit the optical signals to the communication partner optical add drop apparatuses by adding to the transmission path respectively in the first direction and in the second direction, the optical signals having wavelengths different from the wavelengths of the optical signals to be demultiplexed by the fixed wavelength drop filters and each different for each of the communication partner optical add drop apparatuses, the variable wavelength drop filter of each optical add drop apparatus demultiplexes the optical signals having the wavelengths in the process of being transmitted and received between any two optical add drop apparatuses among the other optical add drop apparatuses by the fixed wavelength add filters and the fixed wavelength drop filters of these two optical add drop apparatuses, which wavelengths are different from any one of the wavelengths of the optical signals in the process of being received by the fixed wavelength drop filters of the optical add drop apparatus, in the transmission path respectively in a first direction and in the second direction of the first optical add drop apparatus on the optical network, in the optical signals added from the fixed wavelength add filters of a first optical add drop apparatus, the optical signal having the wavelength dropped by the fixed wavelength drop filter of a second optical add drop apparatus connected in the remotest position from the first optical add drop apparatus in a topology of the optical network, is also a transmission signal to other plural optical add drop apparatuses different from the second optical add drop apparatus on the optical network, the other plural optical add drop apparatuses select the transmission signal through their variable wavelength drop filters, in the plurality of fixed wavelength drop filters of each optical add drop apparatus, respectively in the first direction and in the second direction, the fixed wavelength drop filter demultiplexing the optical signal having a wavelength from a remote communication partner optical add drop apparatuses in an arrangement sequence from the optical add drop apparatus in the topology of the network, is disposed in a position closer to the connection end on the other side of the remote communication partner than the fixed wavelength drop filter demultiplexing the optical signal having a wavelength from a close communication partner optical add drop apparatus in the arrangement sequence, and the fixed wavelength drop filter demultiplexing the optical signal having a wavelength from a close communication partner optical add drop apparatus in the arrangement sequence, is disposed in a position remoter from the connection end on the other side of the close communication partner than the fixed wavelength drop filter demultiplexing the optical signal having a wavelength from a remote communication partner optical add drop apparatus in the arrangement sequence, and in the plurality of fixed wavelength add filters of each optical add drop apparatus, respectively in the first direction and in the second direction, the fixed wavelength add filter adding the optical signal having a wavelength to a remote communication partner optical add drop apparatus in the arrangement sequence, is disposed in a position closer to the connection end on the other side of the remote communication partner than the fixed wavelength add filter adding the optical signal having a wavelength to a close communication partner optical add drop apparatus in the arrangement sequence, and the fixed wavelength add filter adding the optical signal having the wavelength to a close communication partner optical add drop apparatus in the arrangement sequence, is disposed in a position remoter from the connection end on the other side of the close communication partner than the fixed wavelength add filter adding the optical signal having a wavelength to a remote communication partner optical add drop apparatus in the arrangement sequence.

14. An optical network according to claim 11, wherein each of the optical add drop apparatuses further comprises a third optical branching unit connected in series to the transmission path, the fixed wavelength drop filters, the fixed wavelength add filter and the first optical branching unit, and branching part of the wavelength division multiplexed light flowing along the transmission path in a direction different from that of the wavelength division multiplexed light branched by the first optical branching unit, and an optical multiplexing unit multiplexing the wavelength division multiplexed light branched by the first optical branching unit and by the second optical branching unit, and the variable wavelength drop filter demultiplexes an optical signal having a wavelength corresponding to a specified value from the wavelength division multiplexed light multiplexed by the optical multiplexing unit.

15. An optical network according to claim 6,
when a plurality of first optical add drop apparatuses add, as transmission signals to the other plural optical add drop apparatuses on the optical network, the optical signals having the wavelengths different from each other that are dropped by the respective fixed wavelength drop filter of individual second optical add drop apparatuses connected in respective remotest positions from the corresponding individual first optical add drop apparatuses on the topology of the optical network, the other respective plural non-remotest optical add drop apparatuses demultiplex the optical signals having the different wavelengths transmitted from the plurality of first optical add drop apparatuses through the plurality of variable wavelength drop filter units.

16. An optical network according to claim 6, wherein fixed wavelength add drop module are formed by pairing the respective fixed wavelength drop filters with the respective fixed wavelength add filters adding optical signals to be transmitted to transmission sources of the optical signals dropped by the fixed wavelength drop filters.

* * * * *

UNITED STATES PATENT AND TRADEMARK OFFICE
CERTIFICATE OF CORRECTION

| | |
|---|---|
| PATENT NO. | : 7,433,601 B2 |
| APPLICATION NO. | : 11/038515 |
| DATED | : October 7, 2008 |
| INVENTOR(S) | : Yutaka Kai |

It is certified that error appears in the above-identified patent and that said Letters Patent is hereby corrected as shown below:

Column 27, Line 60, change "wavelenath" to --wavelength--.

Column 27, Line 66, change "wavelenath" to --wavelength--.

Column 31, Lines 58-59, change "opticai" to --optical--.

Signed and Sealed this

Sixth Day of January, 2009

JON W. DUDAS
*Director of the United States Patent and Trademark Office*